(12) United States Patent
Heisey et al.

(10) Patent No.: US 11,034,266 B2
(45) Date of Patent: Jun. 15, 2021

(54) CHILD RESTRAINT

(71) Applicant: Dorel Juvenile Group, Inc., Foxboro, MA (US)

(72) Inventors: Nathan W. Heisey, Seymour, IN (US); Jason H. Johnson, Brownstown, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 16/803,478

(22) Filed: Feb. 27, 2020

(65) Prior Publication Data

US 2020/0269733 A1 Aug. 27, 2020

Related U.S. Application Data

(60) Provisional application No. 62/810,992, filed on Feb. 27, 2019.

(51) Int. Cl.
*B60N 2/26* (2006.01)
*B60N 2/28* (2006.01)
*A47D 13/02* (2006.01)

(52) U.S. Cl.
CPC ......... *B60N 2/2845* (2013.01); *A47D 13/025* (2013.01); *B60N 2/2812* (2013.01); *B60N 2/2821* (2013.01)

(58) Field of Classification Search
CPC .. A47D 13/025; B60N 2/2812; B60N 2/2845; B60N 2/2821
USPC .................................................. 297/256.16
See application file for complete search history.

(56) References Cited

U.S. PATENT DOCUMENTS

| | | |
|---|---|---|
| 6,183,044 B1 | 2/2001 | Koyanagi et al. |
| 6,367,875 B1 * | 4/2002 | Bapst ..................... A47D 13/02 |
| | | 297/256.16 X |
| 6,375,260 B1 | 4/2002 | Hiramatsu et al. |
| 6,715,828 B1 | 4/2004 | Cheng |
| 6,913,313 B2 | 7/2005 | Sedlack |
| 6,979,057 B2 | 12/2005 | Sedlack |
| 7,472,955 B2 | 1/2009 | Crane et al. |
| 7,488,034 B2 | 2/2009 | Ohren et al. |
| 7,658,446 B2 | 2/2010 | Meeker et al. |
| 8,070,228 B2 | 12/2011 | Karremans et al. |
| 8,186,757 B2 | 5/2012 | Duncan et al. |
| 8,382,150 B2 | 2/2013 | Williams et al. |
| 8,393,679 B2 | 3/2013 | Longenecker et al. |
| 8,678,498 B2 | 3/2014 | Heisey |
| 8,870,285 B2 | 10/2014 | Williams et al. |
| 8,876,208 B2 | 11/2014 | Heisey et al. |
| 8,973,991 B2 | 3/2015 | Wuerstl |
| 9,085,250 B2 | 7/2015 | Cheng et al. |
| 9,090,181 B2 * | 7/2015 | Williams ............. B60N 2/2821 |
| 9,119,483 B1 * | 9/2015 | Heisey ................... B62B 7/142 |
| 9,168,849 B2 | 10/2015 | Chen |
| 9,216,670 B2 | 12/2015 | Heisey |
| 9,278,632 B2 | 3/2016 | Fang et al. |
| 9,434,279 B2 | 9/2016 | Williams |
| 9,469,222 B2 | 10/2016 | Williams |
| 9,597,986 B2 | 3/2017 | Hou et al. |

(Continued)

Primary Examiner — Rodney B White
(74) Attorney, Agent, or Firm — Barnes & Thornburg LLP

(57) ABSTRACT

A child restraint includes an infant carrier having a carry handle. The infant carrier may be mounted on a stroller frame or on a vehicle seat or may be carried by a caregiver after separation from the stroller frame or vehicle seat.

16 Claims, 15 Drawing Sheets

(56) References Cited

U.S. PATENT DOCUMENTS

| | | |
|---|---|---|
| 9,676,303 B2 | 6/2017 | Hou et al. |
| 9,771,007 B2 | 9/2017 | Shellenberger |
| 9,873,359 B2 | 1/2018 | Williams et al. |
| 10,028,592 B1 | 7/2018 | Ruiz |
| 10,377,274 B2 * | 8/2019 | Anderson ............ B60N 2/2806 |
| 10,406,947 B2 * | 9/2019 | Anderson ............ B60N 2/2863 |
| 10,427,559 B2 * | 10/2019 | Anderson ............ B60N 2/2857 |
| 10,618,435 B2 * | 4/2020 | Anderson ............ B60N 2/2806 |
| 2005/0264062 A1 * | 12/2005 | Longenecker ....... B60N 2/2863 297/250.1 |
| 2006/0273640 A1 * | 12/2006 | Kassai ................. B60N 2/2806 297/256.16 |
| 2008/0067846 A1 * | 3/2008 | Ohren .................. B60N 2/2824 297/256.16 |
| 2008/0313812 A1 * | 12/2008 | Reeves ................ B60N 2/2845 5/655 |
| 2015/0048660 A1 * | 2/2015 | Hou ........................ B60N 2/43 297/256.16 |
| 2016/0121764 A1 * | 5/2016 | Clement ............. B60N 2/2887 297/216.11 |
| 2018/0370392 A1 | 12/2018 | Harmes, V et al. |

* cited by examiner

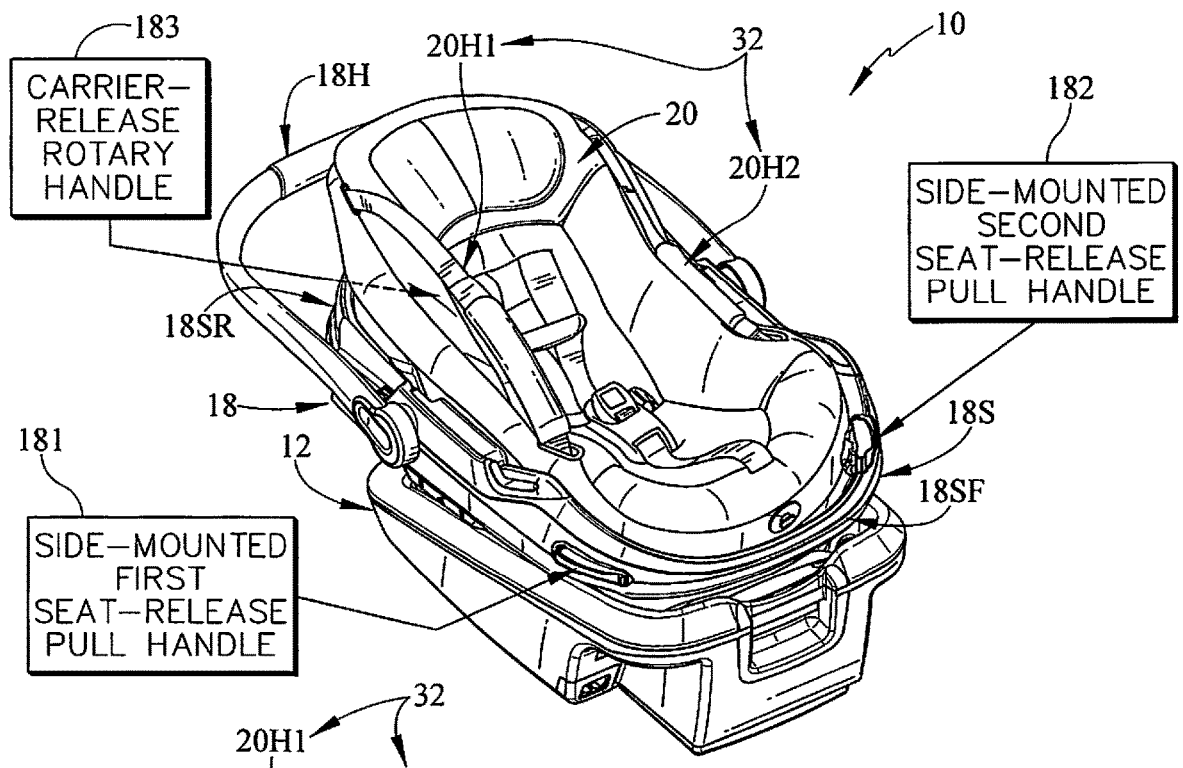
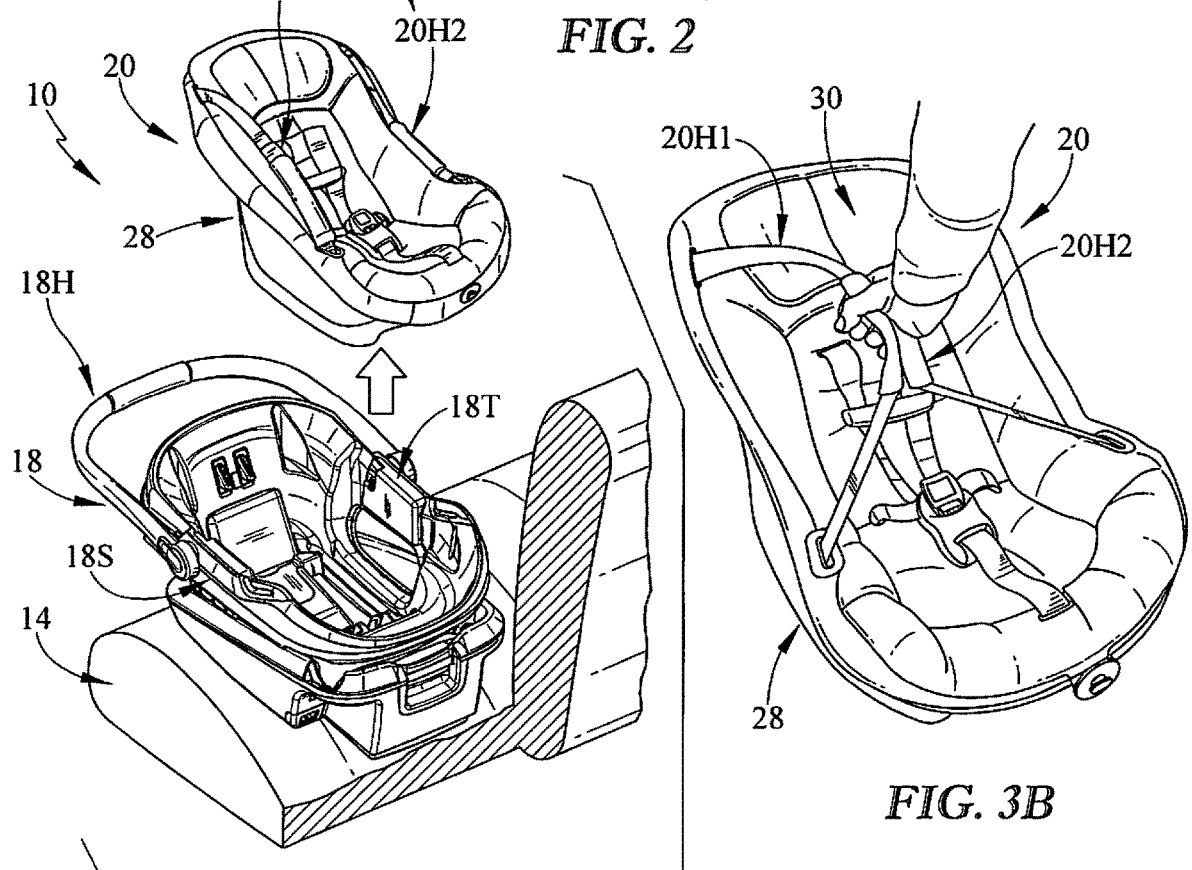
FIG. 2
FIG. 3A
FIG. 3B

CHILD RESTRAINT

PRIORITY CLAIM

This application claims priority to U.S. Provisional Application Nos. 62/810,992, filed Feb. 27, 2019, which application is hereby incorporated by reference herein.

BACKGROUND

The present disclosure relates to a child restraint and particularly to an infant carrier. More particularly, the present disclosure relates to an infant carrier that may be mounted on a foundation that is coupled to a vehicle seat.

SUMMARY

According to the present disclosure, a child restraint includes an infant transporter and a foundation that is configured to hold the infant transporter and adapted to set on a passenger seat in a vehicle. In illustrative embodiments, the infant carrier is an infant transporter that comprises: (i) an excursion-seat carrier having a carry handle and (ii) an infant excursion seat that also includes carry handles and is configured to hold an infant and to be separated from the excursion-seat carrier.

In illustrative embodiments, the child restraint further includes a carrier-mount base that includes the foundation that is adapted to set on a vehicle passenger seat. A releasable base-anchor system is also included in the child restraint and configured to anchor the carrier-mount base to the underside of the excursion-seat carrier. A releasable seat-anchor system is also included in the child restraint and configured to anchor the infant excursion seat to the topside of the excursion-seat carrier.

In illustrative embodiments, a caregiver can operate the releasable seat-anchor system to free the infant excursion seat from the underlying excursion-seat carrier while the excursion-seat carrier remains anchored to the carrier-mount base on the vehicle passenger seat. The caregiver can deploy and use two extensible side carry handles that are included in the infant excursion seat to carry the freed infant excursion seat away from the stationary excursion-seat carrier and the carrier-mount based that each remain in stationary positions relative to the underlying vehicle passenger seat.

In illustrative embodiments, the excursion-seat carrier includes a bucket-support shell that is configured to hold the infant excursion seat and a shell carry handle. The shell carry handle is mounted on the bucket-support shell for pivotable movement between a LAID-BACK INACTIVE position near a rearward end of the bucket-support shell and an upright USE position rising above the bucket-support shell to overlie the infant excursion seat that is held in the bucket-support shell by the releasable seat-anchor system.

In illustrative embodiments, the releasable seat-anchor system comprises a stationary hook receiver that is formed in a bracket that is included in the infant excursion seat and a companion spring-loaded rotatable inboard retainer hook that is included in the excursion-seat carrier. The excursion-seat carrier further includes an inboard-hook release that comprises a seat-release pull handle that is mounted for up-and-down sliding movement on one side of a forward end of the bucket-support shell and an inboard hook rotator that is coupled to the seat-release pull handle and to the spring-loaded rotatable inboard retainer hook. The inboard hook rotator provides means for rotating the spring-loaded rotatable inboard retainer hook away from its normal SEAT-ANCHORING position engaging the stationary hook receiver of the infant excursion seat when the infant excursion seat is at rest on the bucket-support shell to a SEAT-RELEASING position disengaging the stationary hook receiver in response to application of a pulling force by a caregiver to the seat-release pull handle to cause the pull handle to move relative to the bucket-support shell so that the infant excursion seat is free to be separated from the bucket-support shell of the excursion-seat carrier and carried away by a caregiver using the two extensible carry handles included in the infant excursion seat.

In illustrative embodiments, a caregiver can operate the releasable base-anchor system to free the excursion-seat carrier from the carrier-mount base while the infant excursion seat is still anchored to the underlying excursion-seat carrier and while the carrier-mount base remains in a stationary position on the vehicle passenger seat. The caregiver can deploy a pivotable carry handle that is included in the excursion-seat carrier to carry the infant excursion seat that is mated with the topside of the excursion-seat carrier using the pivotable carry handle without using the two extensible side carry handles included in the infant excursion seat.

In illustrative embodiments, the releasable base-anchor system comprises a stationary hook receiver (e.g. rod) that is coupled to the foundation of the carrier-mount base and a companion spring-loaded rotatable outboard retainer hook included in the excursion-seat carrier. The excursion-seat carrier further includes an outboard-hook release that comprises a carrier-release rotary handle that is mounted for rotation on a rearward end of the bucket-support shell and an outboard hook rotator that is coupled to the carrier-release rotary handle and to the spring-loaded rotatable outboard retainer hook. The outboard hook rotator provides means for rotating the rotatable outboard retainer hook away from its normal BASE-ANCHORING position engaging the stationary hook receiver of the carrier-mount base when the excursion-seat carrier is at rest on the foundation to a CARRIER-RELEASING position disengaging the stationary hook receiver of the carrier-mount base in response to application of a torque by a caregiver to the carrier-release rotary handle to cause rotary handle to rotate about a horizontal axis to move relative to the bucket-support shell so that the excursion-seat carrier is free to be separated from the underlying foundation of the carrier-mount base and carried away by a caregiver using the pivotable carry handle included in the excursion-seat carrier while the infant excursion seat is anchored to the bucket-support shell of the excursion-seat carrier.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is a perspective view of the child restraint of FIG. 1 suggesting that the releasable seat-anchor system comprises side-mounted first and second seat-release pull handles that are mounted on opposite sides of a forward end of the excursion-seat carrier and arranged so that a caregiver can pull upwardly on either one of the two seat-release pull handles to free the infant excursion seat from the excursion-seat carrier as suggested in FIG. 3A and further suggesting that the releasable base-anchor system comprises a single carrier-release rotary handle that is mounted on a rearward end of the excursion-seat carrier as shown in FIG. 4 and arranged so that a caregiver can rotate the rotary handle about a horizontal axis to free the carrier-mount base to be separated from the excursion-seat carrier as suggested in FIG. 5A.

FIG. 3A is a perspective view showing that a caregiver has operated either the first or second seat-release pull handle included in the releasable seat-anchor system of the child restraint of FIGS. 1 and 2 to free the infant excursion seat from the underlying excursion-seat carrier while the excursion-seat carrier remains anchored to the underlying carrier-mount base and the carrier-mount base is anchored to an underlying vehicle passenger seat;

FIG. 3B is an enlarged view of the separated infant excursion seat as it is carried by a caregiver using two extensible carry handles that are included in the infant excursion seat;

DETAILED DESCRIPTION

Figure 1:
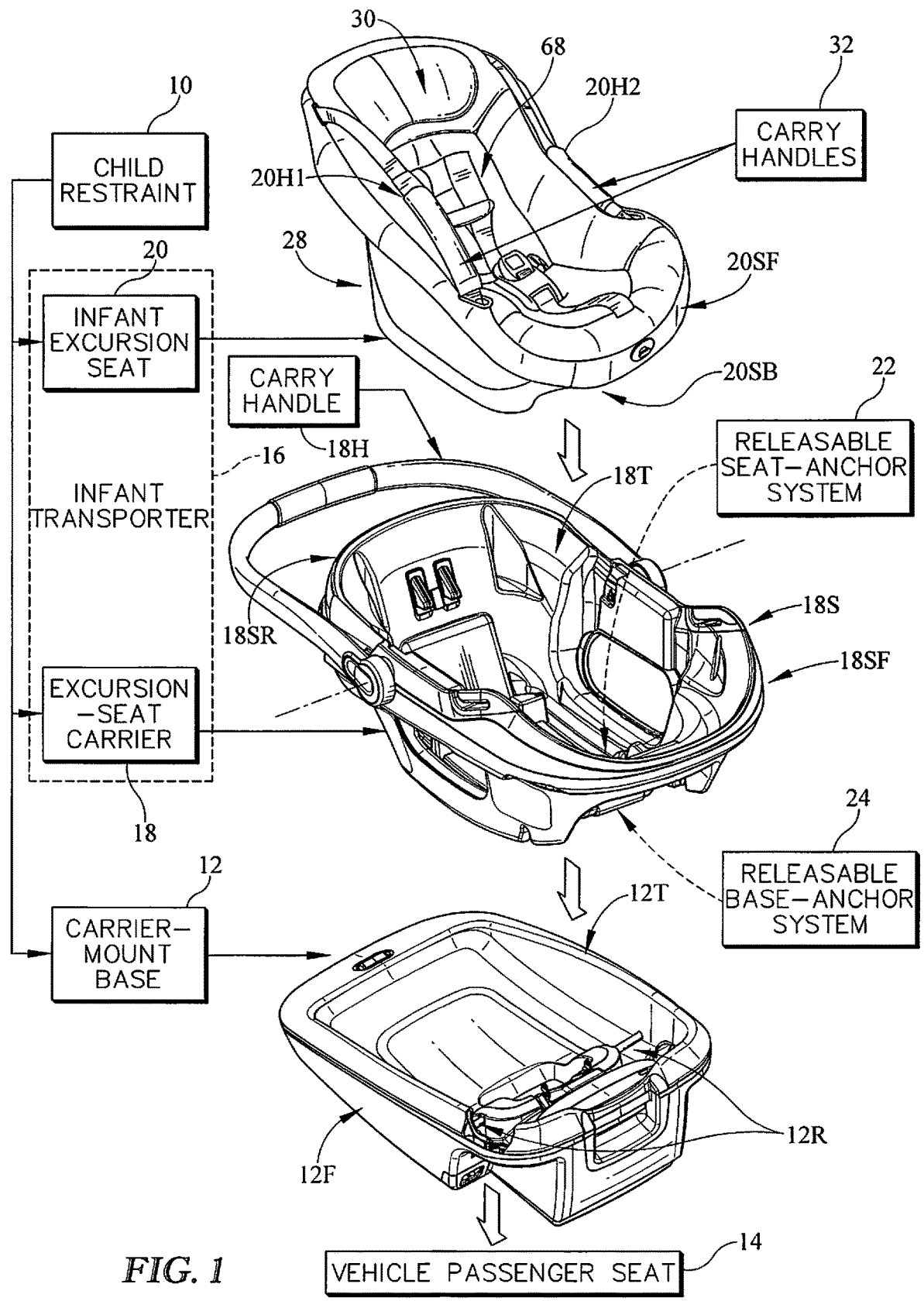
FIG. 1 is a perspective view of three separated components that can be stacked and coupled as shown in FIG. 2 to produce a child restraint and suggesting that the child restraint includes a releasable seat-anchor system in accordance with the present disclosure that can be used by a caregiver to anchor an infant excursion seat to an excursion-seat carrier and a releasable base-anchor system in accordance with the present disclosure that can be used to anchor a carrier-mount base to the excursion-seat carrier and further suggesting that the infant excursion seat and the excursion-seat carrier each include a carry handle and cooperate to provide an infant transporter to allow a caregiver to carry the infant excursion seat by itself to transport an infant seated in the infant excursion seat as suggested in FIG. 3B or to carry the excursion-seat carrier while an infant is seated in an infant excursion seat that is anchored to the excursion-seat carrier as suggested in FIG. 5B.

A child restraint 10 in accordance with the present disclosure includes a carrier-mount base 12 that is adapted to be anchored to a vehicle passenger seat 14 using any suitable means and an infant transporter 16 comprising an excursion-sear carrier 18 and a companion infant excursion seat 20 as shown in FIG. 1. Infant excursion seat 20 is configured to hold and retain an infant (not shown) and can be carrier about by a caregiver using carry handles 20H1, 20H2 included in infant excursion seat 20 as suggested in FIGS. 2, 3A, 3B, and 17. Alternatively, a pivotable carry handle 18H included in excursion-seat carrier 18 can be used by a caregiver to carry the excursion-seat carrier 18 while infant excursion seat 20 holding an infant (not shown) remains anchored to excursion-seat carrier 18 and after excursion-seat carrier 18 has been separated from carrier-mount base 12 by the caregiver as suggested in FIGS. 4, 5A, 5B, and 18.

Figure 11:
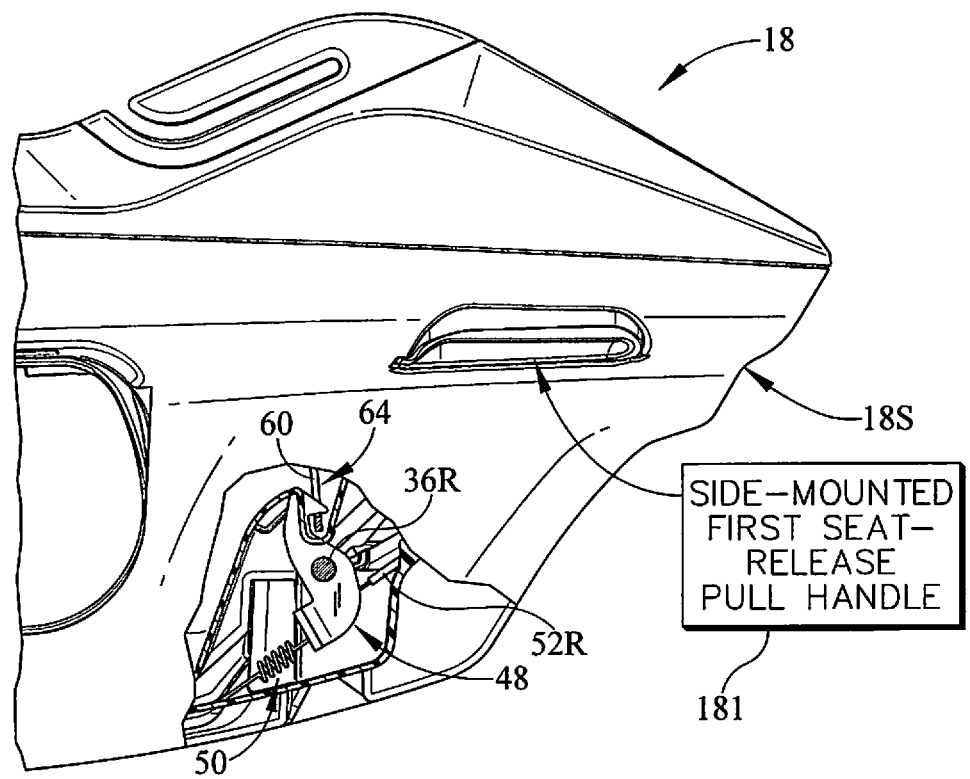
FIG. 11 is a side elevation view of a portion of the excursion-seat carrier with portions broken away to show that the inboard first retainer hook is spring-loaded to rotate in clockwise direction about a horizontal axis to engage a hook receiver included in the infant excursion seat to anchor the infant excursion seat to the excursion-seat carrier.
Figure 12:
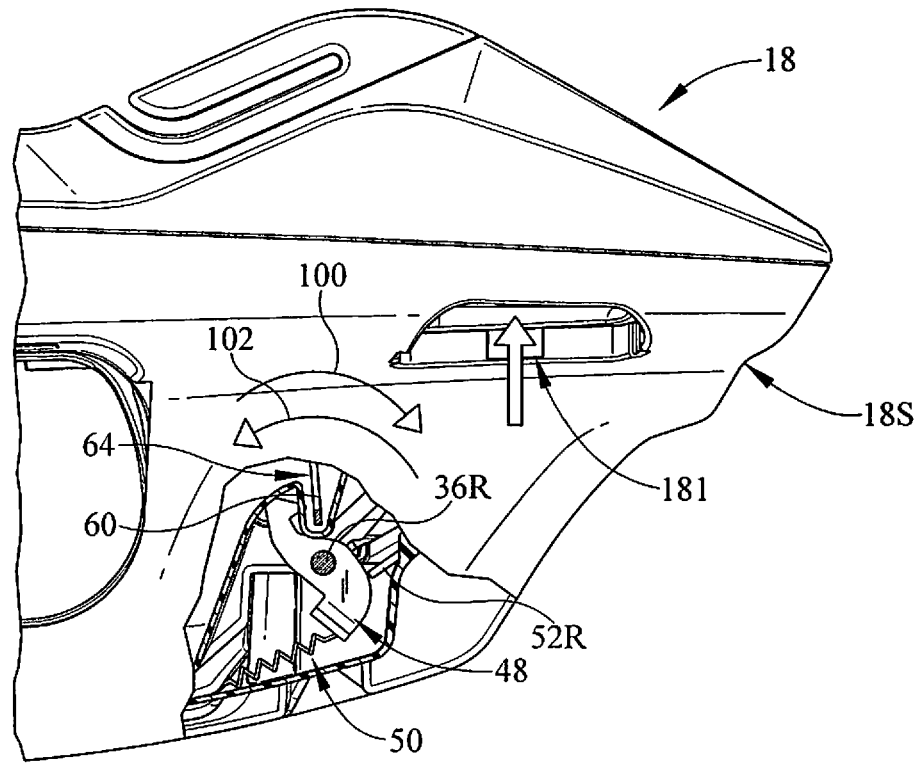
FIG. 12 is a view similar to FIG. 11 showing that a caregiver has pulled one of the side-mounted pull handles mounted on a forward end of the excursion-seat carrier to activate an inboard hook rotator that interconnects the side-mounted pull handle and the spring-loaded inboard first retainer hook to rotate the spring-loaded inboard first retainer hook in a counter clockwise direction about the horizontal axis to disengage the hook receiver of the infant excursion seat to free the infant excursion seat to be separated from the excursion-seat carrier.

A releasable seat-anchor system 22 identified diagrammatically in FIG. 1 is included in child restraint 10 in accordance with the present disclosure to retain infant excursion seat 20 normally in a NESTED position on a topside 18T of excursion-seat carrier 18, as suggested in FIG. 2, until a caregiver pulls upwardly on either one of side-mounted first and second seat-release pull handles 181, 182 mounted for up-and-down movement on a forward end 18SF of a bucket-support shell 18S included in excursion-seat carrier 18. Such actuation of one of pull handles 181, 182 causes a rotatable spring-loaded inboard first retainer hook included in excursion-seat carrier 18 as shown in FIGS. 11 and 12 to disengage a companion first hook receiver 60 included in infant excursion seat 20 to free infant excursion seat 20 from excursion-seat carrier 18 as suggested in FIG. 3A. Once infant excursion seat 20 is freed, it can be carried away by a caregiver using the two carry handles 20H1, 20H2 included in infant excursion seat 20 as suggested in FIG. 3B.

Figure 4:
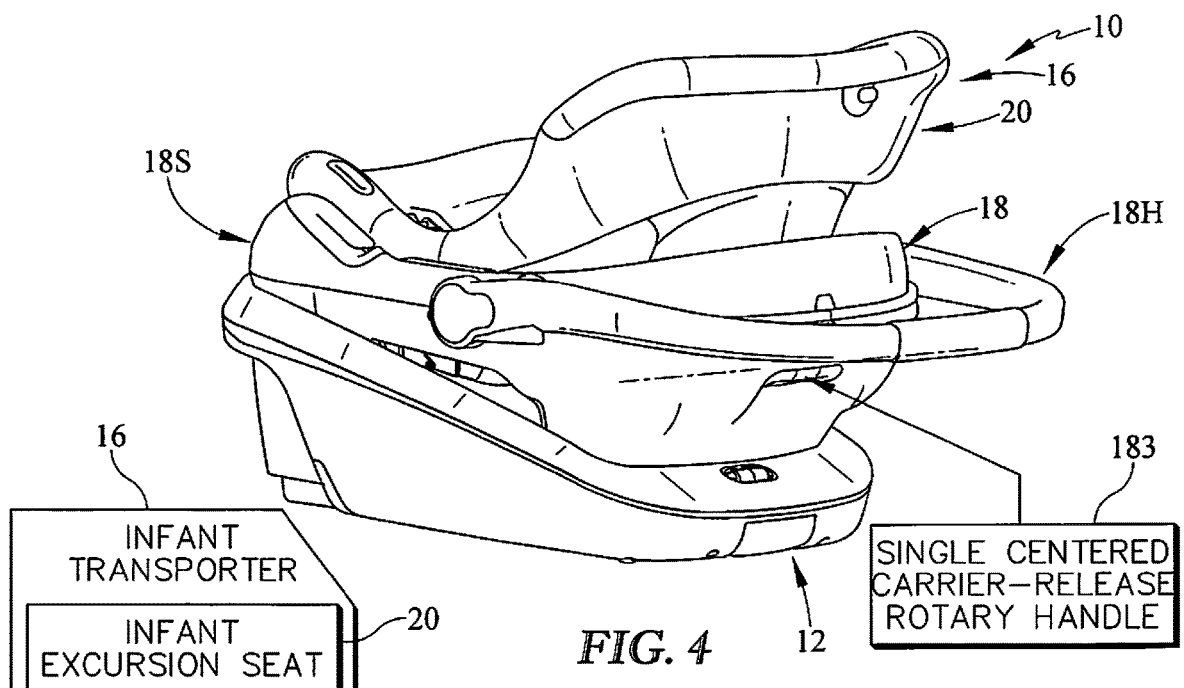
FIG. 4 is a perspective view of the child restraint of FIG. 2 taken from another point of view to show the location on the rearward end of the excursion-seat carrier of the centered single carrier-release rotary handle that is included in the releasable base-anchor system of the child restraint.
Figures 5A, 5B:
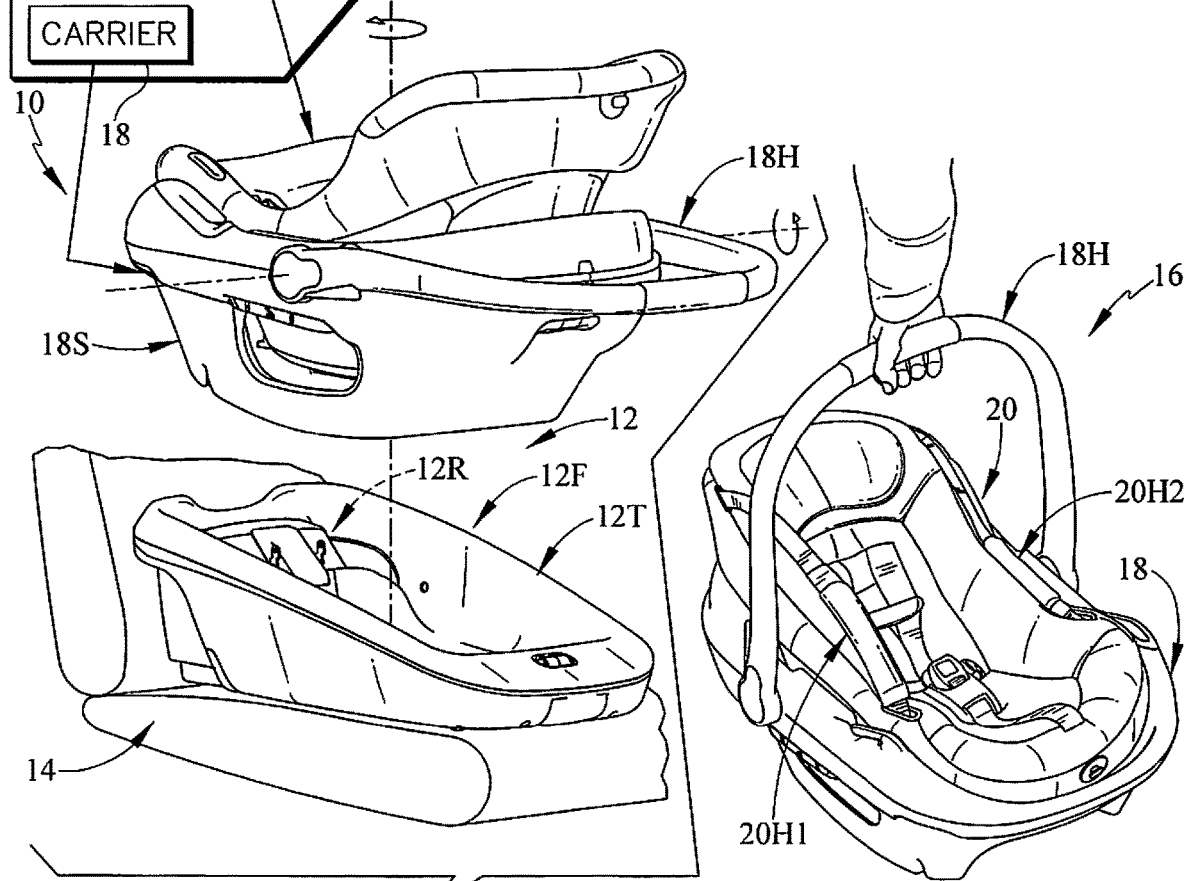
FIG. 5A is a perspective view showing that a caregiver has operated the carrier-release rotary handle included in the releasable base-anchor system of the child restraint of FIGS. 1, 2, and 4 to free the excursion-seat carrier from the underlying carrier-mount base while the infant excursion seat remains anchored to the freed excursion-seat carrier and the carrier-mount base remains anchored to the underlying vehicle passenger seat.
FIG. 5B is an enlarged view of an infant transporter comprising the infant excursion seat and the excursion-seat carrier after the infant transporter has been separated from the carrier-mount base and rotated about a vertical axis as suggested in FIG. 5A and showing that the pivotable carrier handle that is included in the excursion-seat carrier has been pivoted about a horizontal pivot axis from an INACTIVE position shown in FIGS. 4 and 5A to a USE position as shown in FIG. 5B in which the infant transporter comprising the excursion-seat carrier and the infant excursion seat is carried by a caregiver using only the pivotable carry handle that is included in the excursion-seat carrier.
Figure 13:
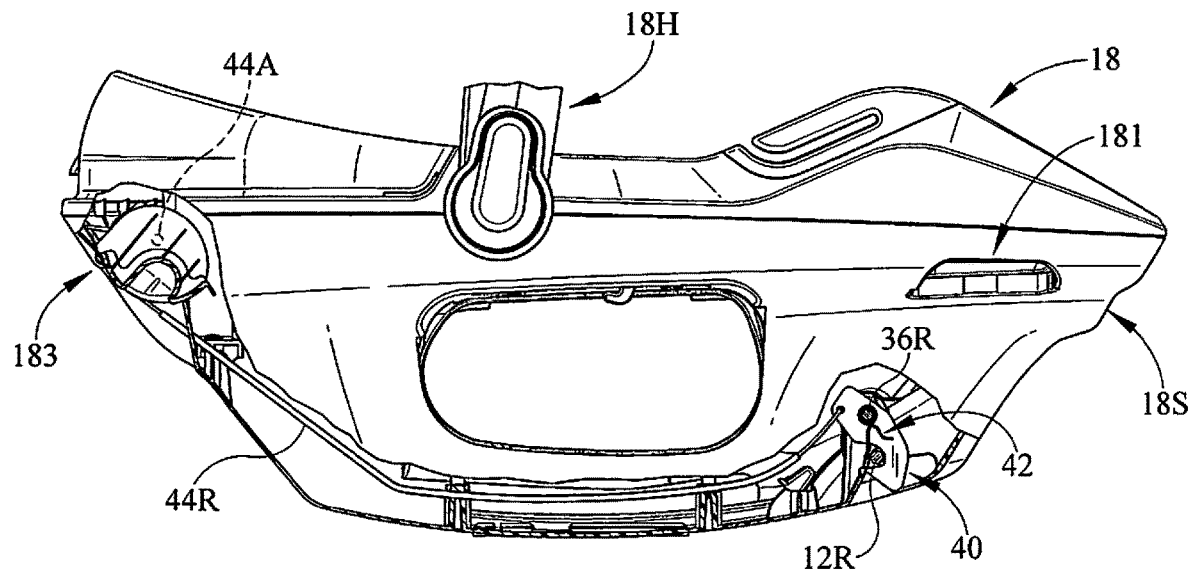
FIG. 13 is a side elevation view of the excursion-seat carrier with portions broken away to show that the outboard first retainer hook is spring-loaded to rotate in clockwise direction about a horizontal axis to engage a hook-receiver rod included in the carrier-mount base to anchor the excursion-seat carrier to the carrier-mount base.
Figure 14:
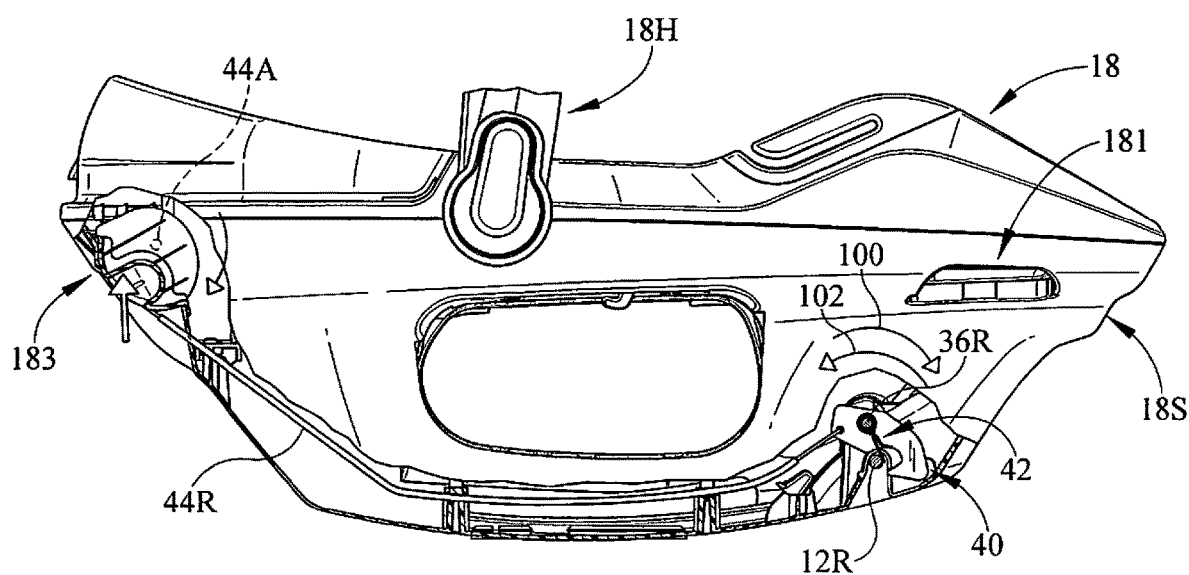
FIG. 14 is a view similar to FIG. 13 showing that a caregiver has rotated the carrier-release rotary handle mounted on a rearward end of the excursion-seat carrier in a clockwise direction to activate an outboard hook rotator that interconnects the carrier-release rotary handle and the spring-loaded outboard first retainer hook to rotate the spring-loaded outboard first retainer hook in a counter clockwise direction about the horizontal axis to disengage the hook-receiver rod of the carrier-mount base to free the excursion-seat carrier to be separated from the carrier-mount base.

A releasable base-anchor system 24 identified diagrammatically in FIG. 1 is included in child restraint 10 in accordance with the present disclosure to retain excursion-seat carrier 18 normally in a NESTED position on a topside 12T of carrier-mount base 12 as suggested in FIGS. 2 and 4 until a caregiver rotates a carrier-release rotary handle 183 that is mounted for rotation on a rearward end 18SR of bucket-support shell 18S of excursion-seat carrier 18 as shown in FIGS. 13 and 14 to disengage a companion first hook receiver 12R included in carrier-mount base 12 to free excursion-seat carrier 18 to be separated from carrier-mount base 12 as suggested in FIG. 5A.

Figure 7:
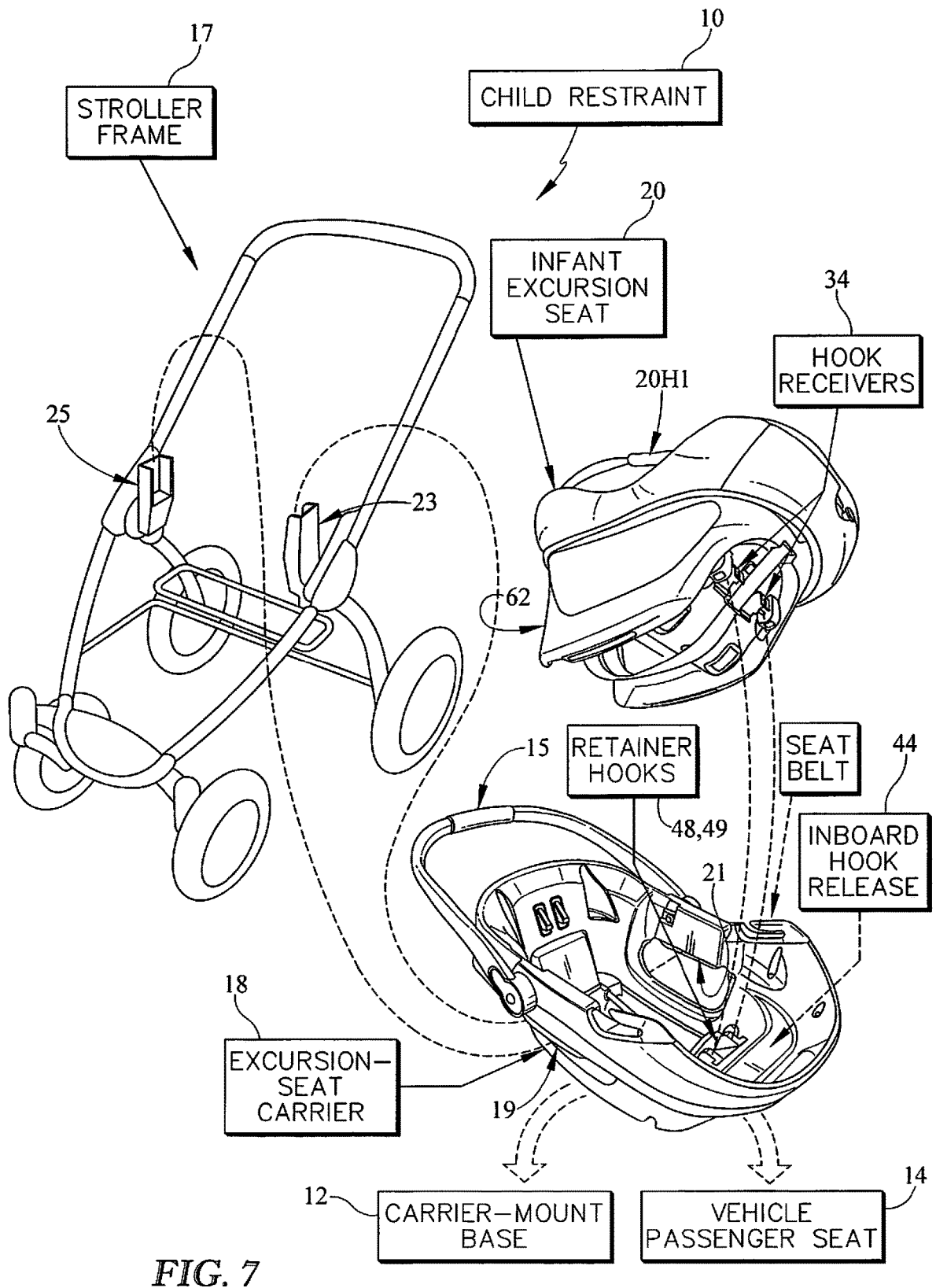
FIG. 7 is a perspective view of a child restraint system in accordance with the present disclosure and suggesting that the excursion-seat carrier is adapted to be mounted on a stroller frame or a carrier-mount base and is also adapted to be held in a stationary position on a vehicle passenger seat using a seat belt associated with the vehicle passenger seat and arranged to pass through the belt receivers formed in the excursion-seat carrier and also suggesting that the releasable seat-anchor system includes first and second hook receivers that are visible on the underside of the infant excursion seat, inboard first and second retainer hooks that are visible on the topside of the excursion-seat carrier, and an inboard hook release located in a forward end of the excursion-seat carrier.

Infant excursion seat 20 includes a seating bucket 28 formed to include an interior child-carrying space 30, a bucket carrier 32 coupled to the seating bucket 28, and a seat retainer 34 coupled to seating bucket 28 as shown in FIGS. 1-5B. Bucket carrier 32 is adapted to be gripped by a caregiver to facilitate transport of seating bucket 28 relative to the excursion-seat carrier 18. In the illustrative embodiment, bucket carrier 32 includes first and second side carry handles 20H1, 20H2. Seat retainer 34 is coupled to a bottom surface 28SB of seating bucket 28 near a forward end 28SF of the seating bucket 28. Seat retainer 34 is arranged to face away from the interior child-carrying space 30 toward excursion-seat carrier 18 as shown in FIG. 7.

Figure 8:
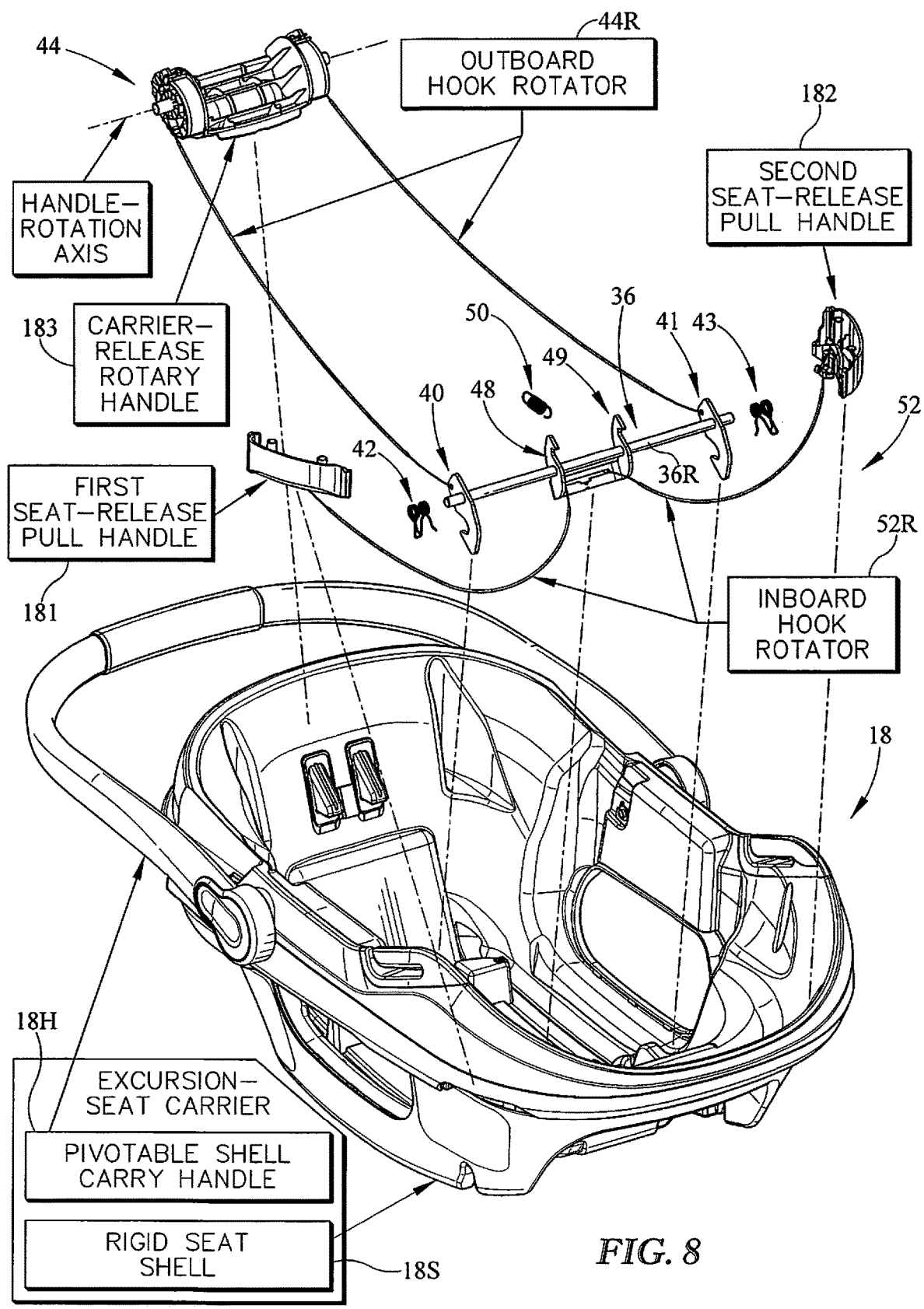
FIG. 8 is an enlarged perspective view showing components that are included in the excursion-seat carrier and showing that the excursion-seat carrier includes a stationary rod that is coupled to a bucket-support shell of the excursion-seat carrier to provide a hook support and suggesting that the releasable seat-anchor system includes inboard first and second retainer hooks mounted in rotative bearing engagement for rotation on the hook support (rod), an inboard hook-rotation (extension) spring, and an inboard hook release comprising independently operable side-mounted first and second seat-release pull handles and an inboard hook rotator arranged to interconnect the seat-release pull handles to the inboard first and second retainer hooks and further suggesting that the releasable base-anchor system further includes outboard first and second retainer hooks mounted in a rotative bearing engagement for rotation on the hook support (rod), outboard hook-rotation (torsion) springs, and an outboard hook rotator comprising a carrier-release rotary handle that is supported on a rearward end of the bucket-support shell for rotation about a horizontal handle-rotation axis and an outboard hook release arranged to interconnect the rotary handle to the outboard first and second retainer hooks.
Figure 9:
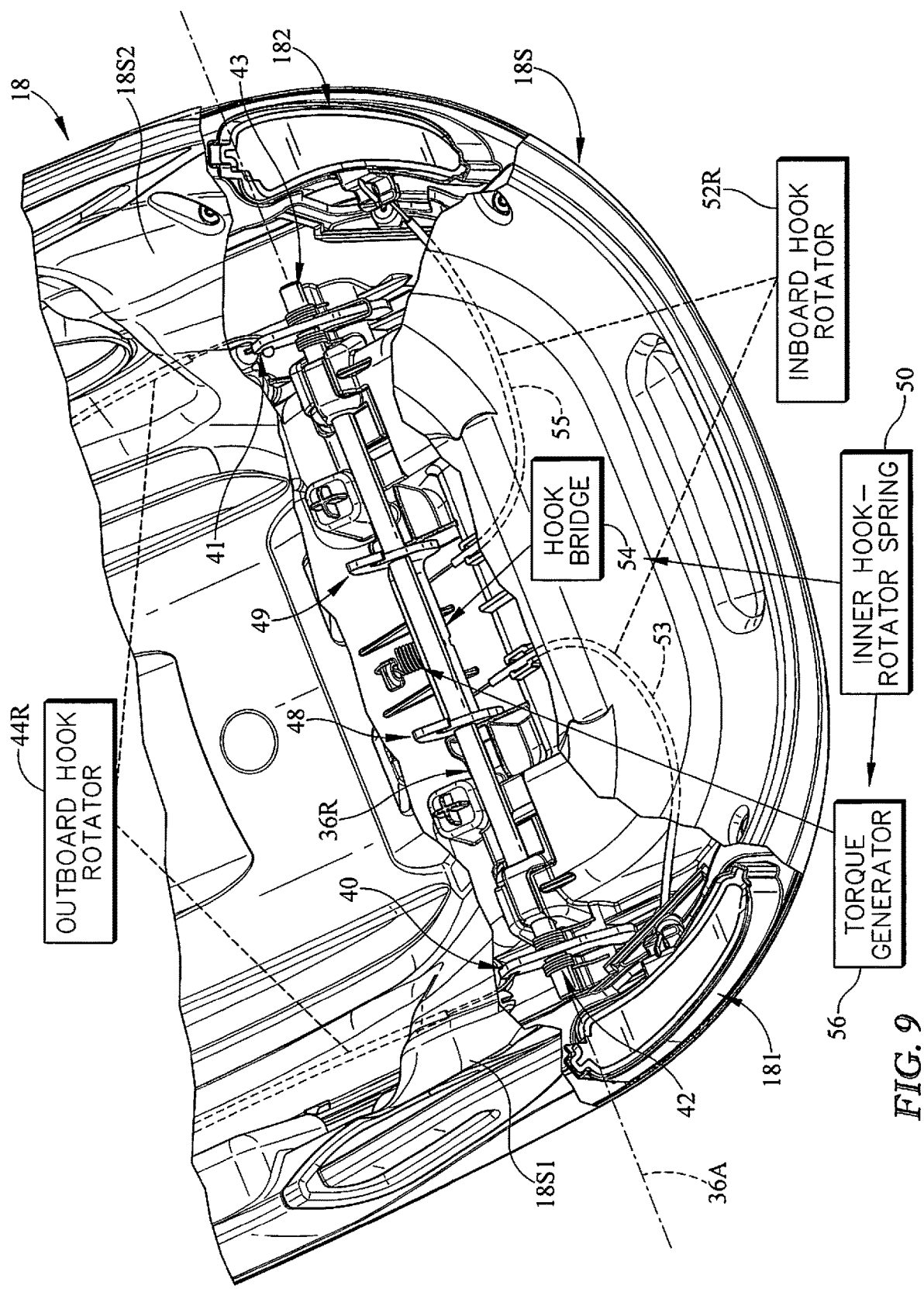
FIG. 9 is an enlarged perspective view of the forward end of the excursion-seat carrier with portions broken away to show the side-mounted first and second seat-release pull handles, the upwardly extending inboard first and second retainer hooks, the inboard hook rotator coupled to the pull handles and to a hook bridge coupled to the inboard first and second retainer hooks, a hook-rotator spring coupled to the hook bridge and to a floor of the bucket-support shell, the downwardly extending outboard first and second retainer hooks, and the tension spring associated with each of the outboard first and second retainer hooks.
Figure 10:
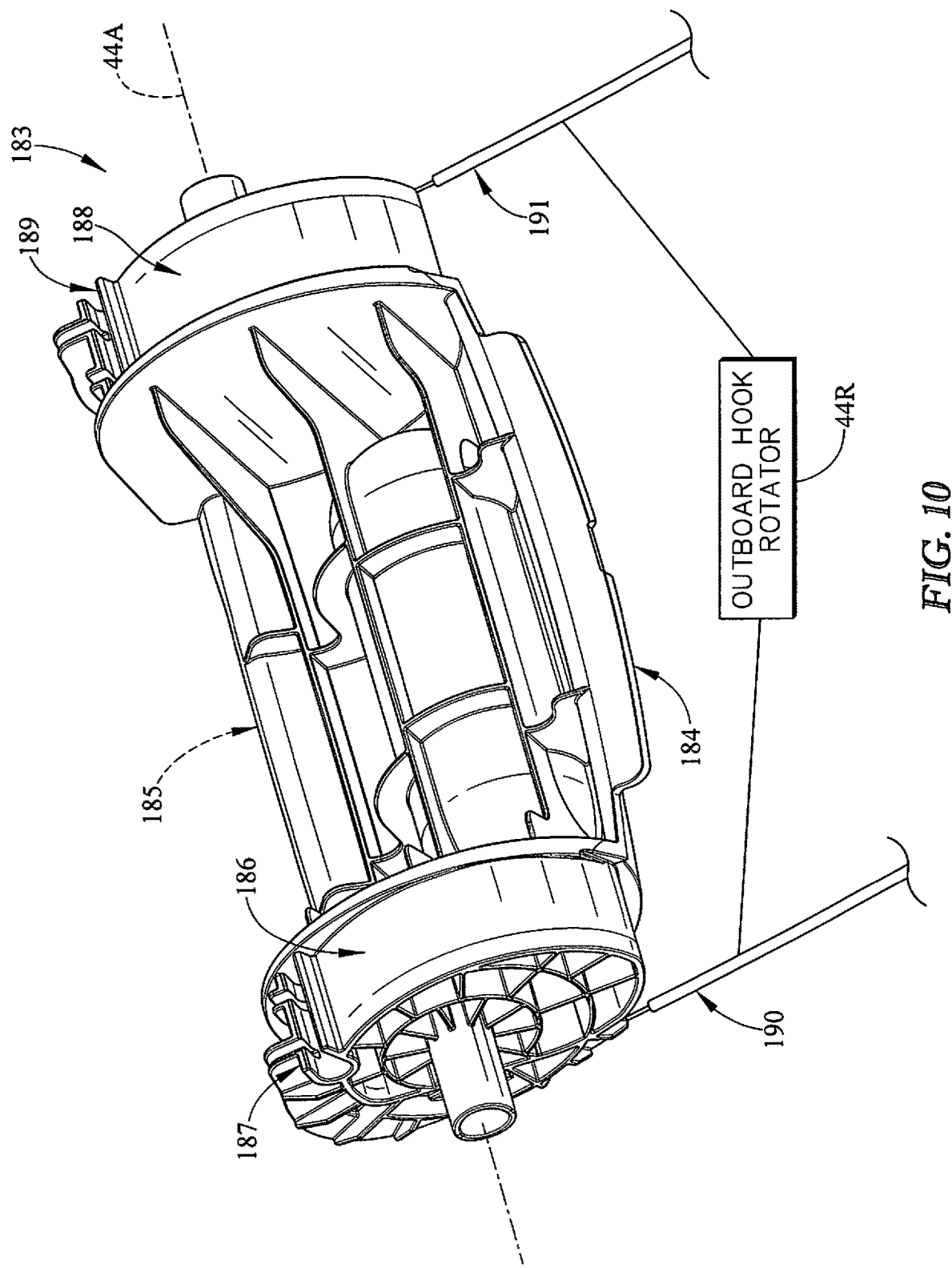
FIG. 10 is an enlarged perspective view of the carrier-release rotary handle showing connection of the outboard hook rotator to the carrier-release rotary handle.

Excursion-seat carrier 18 includes a bucket-support shell 18S, a shell carry handle 18H, releasable seat-anchor system 22, releasable base-anchor system 24, and a hook support 36, as shown in FIGS. 1, 8, and 9 Bucket-support shell 18S is formed to include a bucket-receiving space 38 sized to receive a portion of seating bucket 28 when seating bucket 28 is mounted on bucket-support shell 18S. Shell carry handle 18H is coupled to bucket-support shell 18S for pivotable movement relative to bucket-support shell 18S about a pivot axis 18P between a LAID-BACK INACTIVE position, as shown in FIG. 5A, and an UPRIGHT USE position, as shown in FIG. 5B. Hook support 36 is coupled to bucket-support shell 18S in a fixed position and cooperates with releasable seat-anchor system 22 and releasable base-anchor system 24 to retain infant excursion seat 20 to excursion-seat carrier 18 and to retain excursion seat carrier 18 to carrier-mount base 12.

Carrier-mount base 12 includes a foundation 12F adapted to set on a passenger seat in a vehicle as shown in FIGS. 3A and 5A and a carrier retainer 12R coupled to the foundation 12F as shown in FIG. 1. Carrier retainer 12R is configured to mate with releasable base-anchor system 24 to retain excursion-seat carrier 18 to foundation 12F of carrier-mount base 12 which cooperate to provide infant transporter 16. Carrier retainer includes a first hook receiver 12R1 mounted on a first side of carrier foundation 12F and a second hook receiver 12R2 mounted on an opposite second side of carrier foundation 12F.

Carry handle 18H may be grasped by a caregiver to carry both excursion-seat carrier 18 and infant excursion seat 20. A caregiver may transport infant transporter 16 using carry handle 18H to a stroller frame 17 or to a vehicle passenger seat or carrier-mount base 12 on a vehicle passenger seat as suggested in FIG. 7. Bucket support shell 18S includes first and second stroller mounts 19, 21 that may be mounted on companion mount posts 23, 25 coupled to stroller frame 17 or to a vehicle passenger seat or a carrier-mount based on a vehicle passenger seat 14.

Releasable seat-anchor system 22 includes an inboard first retainer hook 48, an inner first hook-rotator spring 50, and an inboard-hook release 52 as shown in FIGS. 8 and 9. Inboard first retainer hook 48 is mounted on hook support 36 for rotation about hook support 36 as shown in FIGS. 11 and 12. Inner first hook-rotator spring 50 is arranged to act between bucket-support shell 18S and inboard first retainer hook 48 to urge inboard first retainer hook 48 to rotate in the first direction 100 about hook support 36. Inboard first retainer hook 48 is biased by first hook-rotator spring 50 to a NORMAL RAISED position to extend upwardly to engage seat retainer 34 of infant excursion seat 20 to block separation of infant excursion seat 20 from excursion-seat carrier 18 when infant excursion seat 20 is mounted on a topside 18T of excursion-seat carrier 18. Inboard-hook release 52 is arranged to rotate inboard first retainer hook 48 about hook support 36 in an opposite second direction 102 to overcome a biasing torque applied by inner first hook-rotator spring 50. Inboard-hook release 52 is configured to disengage inboard first retainer hook 48 from seat retainer 34 of infant excursion seat 20 to free infant excursion seat 20 to be separated from excursion-seat carrier 18 by a caregiver as suggested in FIGS. 3A and 3B. Application of a pulling force on first or second side-mounted seat release pull handles 181, 182 causes inboard-hook release 52 to rotate first retainer hook 48 in the second direction 102 from the NORMAL RAISED position to a relatively lower TEMPORARY LOWERED position to disengage seat retainer 34 so that infant excursion seat 20 can be separated from excursion seat carrier 18 as suggested in FIGS. 11 and 12.

Releasable base-anchor system 24 includes an outboard first retainer hook 40, an outer first hook-rotator spring 42, and an outboard-hook release 44 as shown in FIGS. 8 and 9. Outboard first retainer hook 40 is mounted on hook support 36 for rotation about hook support 36. Outer first hook-rotator spring 42 is arranged to act between bucket-support shell 18S and outboard first retainer hook 40 to urge outboard first retainer hook 40 to rotate in a first direction 100 about the hook support 36. Outboard first retainer hook 40 extends downwardly to engage the carrier retainer 12R of the carrier-mount base 12 in a NORMAL LOWERED position to block separation of the excursion-seat carrier 18 from the carrier-mount base 12 when the excursion-seat carrier 18 is mounted on a topside 12T of the carrier-mount base 12. Outboard-hook release 44 is arranged to rotate outboard first retainer hook 40 about hook support 36 in an opposite second direction 102 to a TEMPORARY RAISED position to overcome a biasing torque applied by outer first hook-rotator spring 42. Outboard-hook release 44 is configured to disengage outboard first retainer hook 40 from the carrier retainer 12R of the carrier-mount base 12 to free the excursion-seat carrier 18 to be separated from the carrier-mount base 12 by a caregiver as suggested in FIGS. 13 and 14.

In the illustrative embodiment, hook support 36 includes an elongated rod 36R that is arranged to extend laterally along a central rod axis 36A between opposing first and second side walls 18S1, 18S2 of the bucket-support shell 36 as shown in FIG. 9. Outboard first retainer hook 40 is arranged to lie in spaced-apart relation to the second side wall 182 to locate the inboard first retainer hook therebetween. Each of outboard and inboard first retainer hooks 40, 48 is mounted in rotative bearing engagement with the elongated rod 36R to rotate independently of one another about the central rod axis 36A.

Releasable base-anchor system 24 further includes an outboard second retainer hook 41 mounted in rotative bearing engagement with the elongated rod 36R to rotate about central rod axis 36A as shown in FIG. 9. Outboard second retainer hook 41 is arranged to lie in spaced-apart relation to outboard first retainer hook 40 to locate inboard first retainer hook 48 therebetween as shown in FIGS. 8 and 9. Outboard-hook release 44 is arranged to be mounted relative to bucket-support shell 18S to rotate outboard first and second retainer hooks 40, 41 in unison in the opposite second direction 102 about central rod axis 36A without rotating inboard first retainer hook 48 about central rod axis 36A in the opposite second direction 102.

Releasable seat-anchor system 22 further includes an inboard second retainer hook 49 mounted in rotative bearing engagement with elongated rod 36R to rotate about central rod axis 36A independent of rotation of outboard first and second retainer hooks 40, 41 about the central rod axis as shown in FIG. 9. Inboard second retainer hook 29 is arranged to lie between inboard first retainer hook 48 and outboard second retainer hook 41 as shown in FIGS. 8 and 9. Inboard-hook release 52 is arranged to be moved relative to bucket-support shell 18S to rotate inboard first and second retainer hooks 48, 49 in the second opposite direction 102 in unison about central rod axis 36A without rotating outboard first and second retainer hooks 40, 41 about central rod axis 36A in the opposite second direction 102.

Inboard hook release 52 includes a first seat-release pull handle 181 mounted on bucket-support shell 18S for sliding movement relative to bucket-support shell 18S and an inboard hook rotator 52R coupled to inboard first retainer hook 48 and to first seat-release pull handle 181 as shown in FIGS. 11 and 12. Inboard hook rotator 52R is arranged to rotate inboard first retainer hook 48 about central rod axis 36A in the opposite second direction 102 without rotating outboard first retainer hook 40 about central rod axis 36A. Inboard hook rotator 52R provides means for rotating spring-loaded rotatable inboard retainer hook 48 away from its normal SEAT-ANCHORING position engaging stationary hook receiver 34 of infant excursion seat 20 when infant excursion seat 20 is at rest on the bucket-support shell 18S to a SEAT-RELEASING position disengaging stationary hook receiver 34 in response to application of a pulling force by a caregiver to one of seat-release pull handles 181, 182 to cause the pull handle to move relative to bucket-support shell 18S so that infant excursion seat 20 is free to be separated from bucket-support shell 18S of excursion-seat carrier 20 and carried away by a caregiver using the two extensible carry handles 20H1, 20H2 included in infant excursion seat 20.

Figure 15:
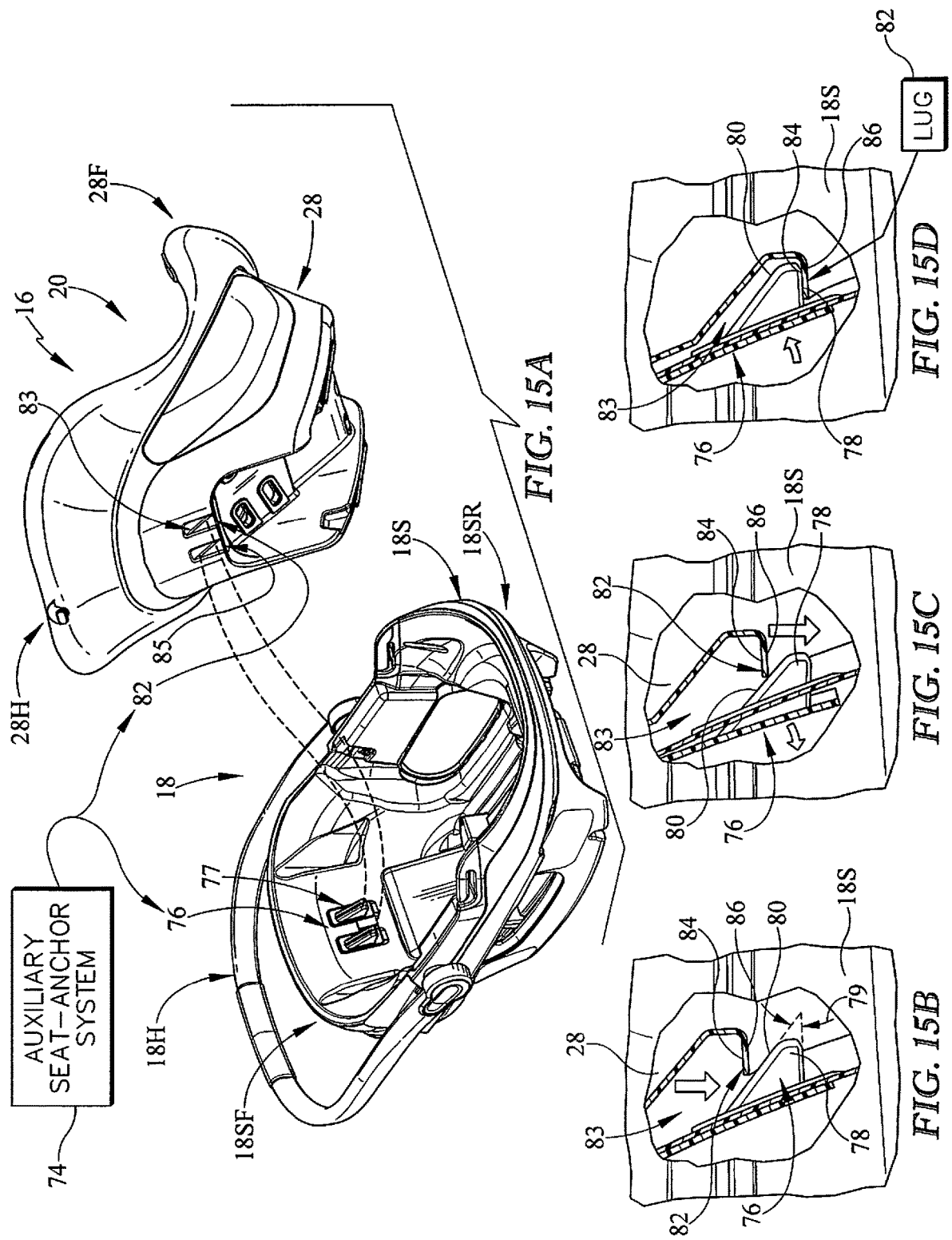
FIG. 15A is a perspective view of the infant transporter showing that the child restraint further includes an auxiliary seat-anchor system that includes a spring-loaded first seat-retainer latch and a lug that engages the spring-loaded first seat-retainer latch to anchor the infant excursion seat to the excursion seat carrier.
FIG. 15B is a sectional view showing the first lug spaced apart from the spring-loaded first seat-retainer latch.
FIG. 15C is a sectional view showing the infant excursion seat lowered such that a downwardly-facing barrier surface of the first lug engages an upwardly-facing ramp of the spring-loaded first seat-retainer latch to cause the spring-loaded first seat-retainer latch to move relative to the bucket support shell.
FIG. 15D is a sectional view showing the infant excursion seat fully installed such that the spring-loaded first seat-retainer latch is received in a latch receiving space and an upwardly-facing motion-blocking retainer surface of the first lug is arranged in confronting relation with the downwardly-facing barrier surface to block separation of the infant excursion seat from the excursion seat carrier.

Inboard hook release 52 further includes a second seat-release pull handle 182 mounted on bucket-support shell 18S to lie in spaced-apart relation to first seat-release pull handle 181 as shown in FIGS. 2 and 15. Second seat-release pull handle 182 is mounted to bucket-support shell 18S for sliding movement relative to bucket-support shell 18S. Inboard hook rotator 52R is also coupled to second seat-release pull handle 182 and is arranged to rotate inboard first retainer hook 48 about hook support 36 in response to sliding movement of second seat-release pull handle 182 relative to the bucket-support shell. Inboard hook rotator 52R is coupled to each of the first and second seat-release handles 181, 182 and is configured to rotate inboard first retainer hook 48 in the opposite second direction about hook support 36 in response to sliding movement of one of the first and second seat-release pull handles 181, 182 relative to bucket-support shell 18S of the seat-excursion carrier 18. Inboard hook rotator 52R is configured to provide means for rotating inboard first retainer hook 48 about hook support 36 to disengage seat retainer 34 included in infant excursion seat 20 in response to movement of one of the first and second seat-release pull handles 181, 182 from a NORMAL LOWERED position to a TEMPORARY RAISED position to free infant excursion seat 20 to be separated from excursion-seat carrier 18 by a caregiver.

Releasable seat-anchor system 22 further includes an inboard second retainer hook 49 mounted on hook support 36 for rotation about hook support 36 as shown in FIG. 15. Inner hook-rotator spring 50 includes a hook bridge 54 and a torque generator 56. Hook bridge 54 is arranged to interconnect inboard first and second retainer hooks 48, 49 to cause inboard first and second retainer hooks 48, 49 to rotate in unison about hook support 36. Torque generator 56 is arranged to interconnect hook bridge 54 to bucket-support shell 18S of excursion-seat carrier 18. Torque generator 56 is configured to yieldably rotate hook bridge 54 about hook support 36 to cause inboard first and second retainer hooks 48, 49 to engage seat retainer 34 of infant excursion seat 20 to block separation of infant excursion seat 20 from excursion-seat carrier 18 when infant excursion seat 20 is mounted on the topside 18T of excursion-seat carrier 18. In the illustrative embodiment, inboard hook rotator 52R includes a first cable 53 that interconnects first seat-release pull handle 181 and hook bridge 54 and a second cable 55 that interconnects second seat-release pull handle 182 and hook bridge 54. Cables 53, 55 are illustratively embodied as Bowden cables but any suitable type of cable may be used.

Outboard-hook release 44 includes a carrier-release rotary handle 183 mounted on bucket-support shell 18S for rotation about a handle-rotation axis 44A and an outboard hook rotator 44R coupled to outboard first retainer hook 40 and to carrier-release rotary handle 183 as shown in FIGS. 13 and 14. Outboard hook rotator 44R is arranged to rotate outboard first retainer hook 40 about central rod axis 36A in the opposite second direction 102 without rotating inboard first retainer hook 48 about central rod axis 36A. Outboard hook rotator 44R provides means for rotating rotatable outboard retainer hook 40 away from its normal BASE-ANCHORING position engaging stationary hook receiver 12R of the carrier-mount base 12 when excursion-seat carrier 20 is at rest on foundation 12F to a CARRIER-RELEASING position disengaging stationary hook receiver 12R of carrier-mount base 12 in response to application of a torque by a caregiver to carrier-release rotary handle 183 to cause rotary handle 183 to rotate about a horizontal axis 44A to move relative to bucket-support shell 18S so that excursion-seat carrier 20 is free to be separated from the underlying foundation 12F of carrier-mount base 12 and carried away by a caregiver using pivotable carry handle 18H included in excursion-seat carrier 18 while infant excursion seat 20 is anchored to bucket-support shell 18S of excursion-seat carrier 18.

Outboard hook release 44R includes first spring 42 coupled to bucket-support shell 18S and the outboard first retainer hook 40 and a second spring 43 coupled to bucket-support shell 18S and outboard second retainer hook 41 as shown in FIG. 15. First spring 42 is arranged yieldably to move outboard first retainer hook 40 relative to bucket-support shell 18S from a TEMPORARY RAISED position to a relatively lower NORMAL LOWERED position. Second spring 43 is arranged yieldably to move outboard second retainer hook 41 relative to bucket-support shell 18S from a TEMPORARY RAISED position to a relatively lower NORMAL LOWERED position. Outboard hook rotator 44R is configured to provide means for rotating outboard first and second retainer hooks 40, 41 to disengage carrier retainer 12R included in carrier-mount base 12 in response to movement of carrier-release rotary handle 183 to free the excursion-seat carrier 18 to be separated from the carrier-mount base 12 by a caregiver.

Carrier-release rotary handle 183 includes a handle body 184, a first pulley 186 coupled to a first side of the handle body 184, and a second pully 188 coupled to an opposite second side of the handle body 184. Handle body 184 provides a handgrip 185 that is visible through an opening in bucket-support shell 18S and can be actuated by a caregiver to rotate first and second pulleys 186, 188 about axis 44A. First pulley 186 is formed to include a first anchor slot 187 formed in an upper portion of first pulley 186. Second pulley is formed to include a second anchor slot 189 formed in an upper portion of second pulley 188. Outboard hook rotator 44R includes a first cable 190 mounted to first pulley 186 at first anchor slot 187 and a second cable 191 mounted to second pulley 188 at second anchor slot 188. First and second cables 190, 191 extend under respective first and second pulleys 186, 188 following a contour of first and second pulleys 186, 188 until they attach to first and second pulleys 186, 188 at first and second anchor slots 187, 189. In the illustrative embodiment, the cables 190, 191 are Bowden cables and extend between first and second pulleys 186, 188 and outboard first and second retainer hooks 40, 41, respectively.

Bucket-support shell 18S has a rearward end 18SR and an opposite forward end 18SF as shown in FIGS. 1-5B. Carrier-release rotary handle 183 is coupled to rearward end 18SR. First seat-release pull handle 181 is coupled to a first side 18S1 of the opposite forward end 18SF. Second seat-release pull handle 182 is coupled to an opposite second side 18S2 of the opposite forward end 18SF. Seating bucket 28 has a head end 28H configured to receive a head of an infant (not shown) seated in interior child-carrying space 30 and an opposite foot end 28F configured to receive feet of an infant (not shown) seated in the interior child-carrying space 30 as shown in FIG. 1. Head end 28H of seating bucket 28 is aligned to lie in close proximity to rearward end 18SR of bucket-support shell 18S and foot end 28F of seating bucket 28 is aligned to lie in close proximity to forward end 18SF of bucket-support shell 18S when seating bucket 28 of infant excursion seat 20 is retained in a stationary position on bucket-support shell 18S of the excursion-seat carrier 18.

Figure 6A:
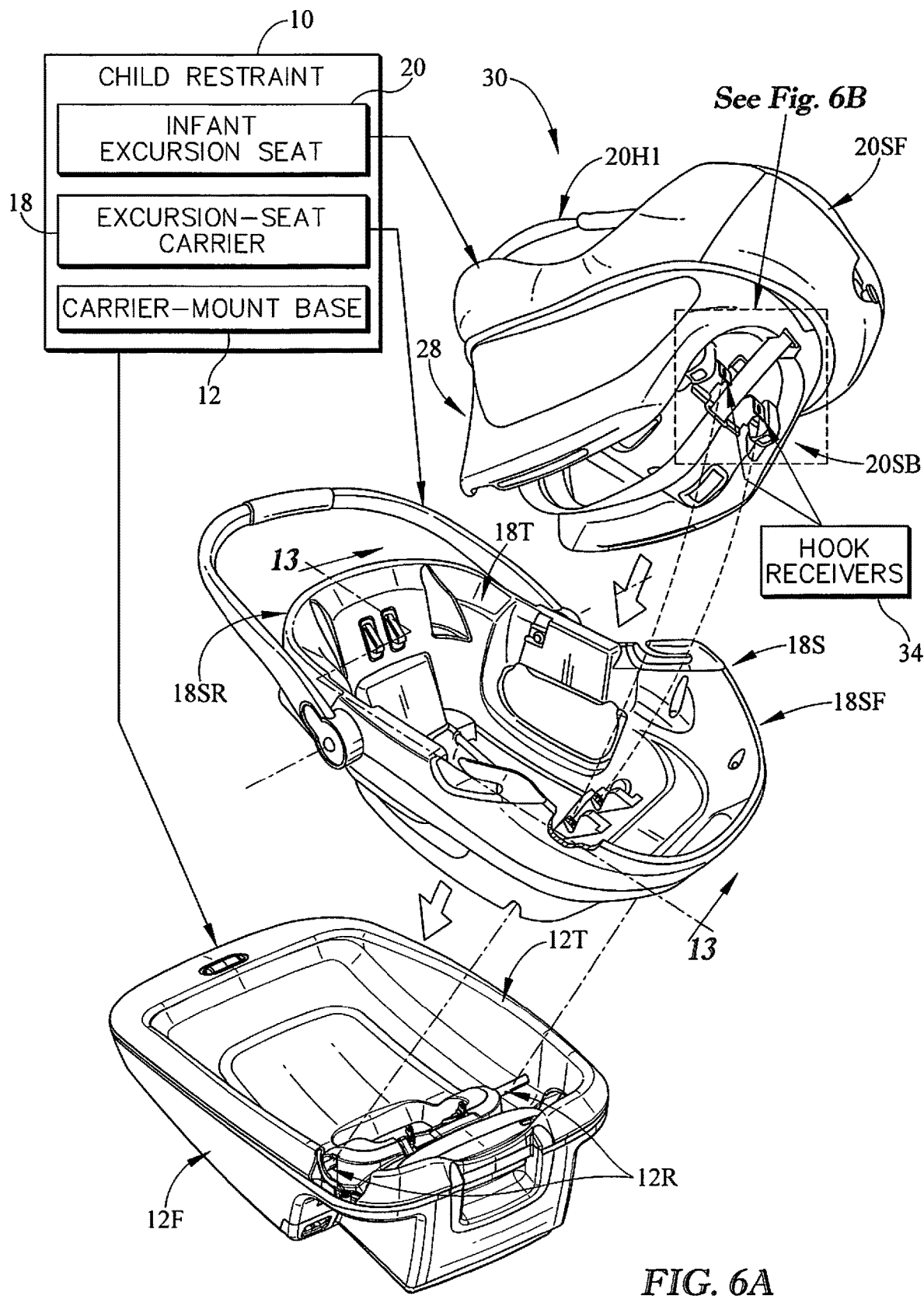
FIG. 6A is an exploded perspective view of the child restraint of FIG. 4 with portions of the excursion-seat carrier and the carrier-mount base broken away.
Figure 6B:
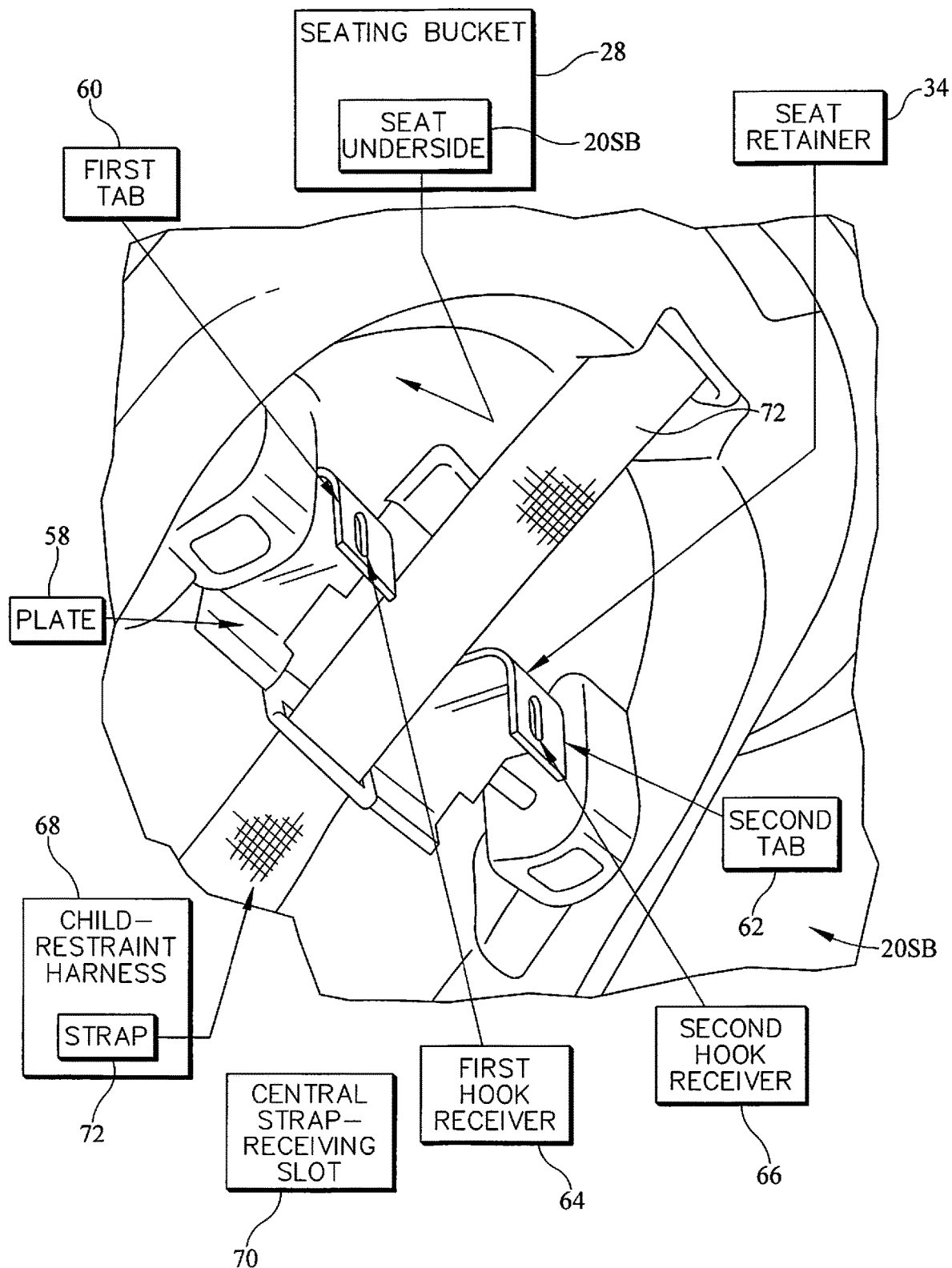
FIG. 6B is an enlarged portion of FIG. 6A showing the seat retainer that is mounted on an underside of the seating bucket and that the seat retainer is formed to include hook receivers that are formed to receive the inboard retainer hooks.

Seat retainer 34 of infant excursion seat 20 includes a plate 58 mounted on an underside of the seating bucket, a first tab 60 cantilevered to the plate 58, and a second tab 62 also cantilevered to the plate 58 as shown in FIGS. 6A and 6B. First tab 60 extends in a downward direction away from interior child-carrying space 30 formed in seating bucket 28 and is formed to include a first hook-receiving aperture 64. First hook-receiving aperture 64 is arranged to receive a distal portion of inboard first retainer hook 48 therein when inboard first retainer hook 48 is engaged to seat retainer 34. Second tab 62 extends in a downward direction away from interior child-carrying space 30 formed in the seating bucket and is arranged to lie in laterally spaced-apart relation to first tab 60. Second tab 62 is formed to include a second hook-receiving aperture 66 that is arranged to receive a distal portion of inboard second retainer hook 49 therein when inboard second retainer hook 49 is engaged to seat retainer 34. When the infant excursion seat 20 is installed into the excursion seat carrier 18 the plate 58 places pressure on the inboard hooks 48, 49 and the inboard hooks pivot away from the plate 58 and close around the first tab 60 and the second tab 62 in apertures 64, 66.

Infant excursion seat 20 further includes a child-restraint harness 68 coupled to seating bucket 28 to restrain a child seated in interior child-carrying space 30 formed in seating bucket 28. Plate 58 is formed to include a central strap-receiving slot 70 located between first and second tabs 60, 62 as shown in FIG. 6B. Child-restraint harness 68 includes a strap 72 that is arranged to extend along an underside of seating bucket 28 and pass through central strap-receiving slot 70 formed in plate 58.

Figure 16:
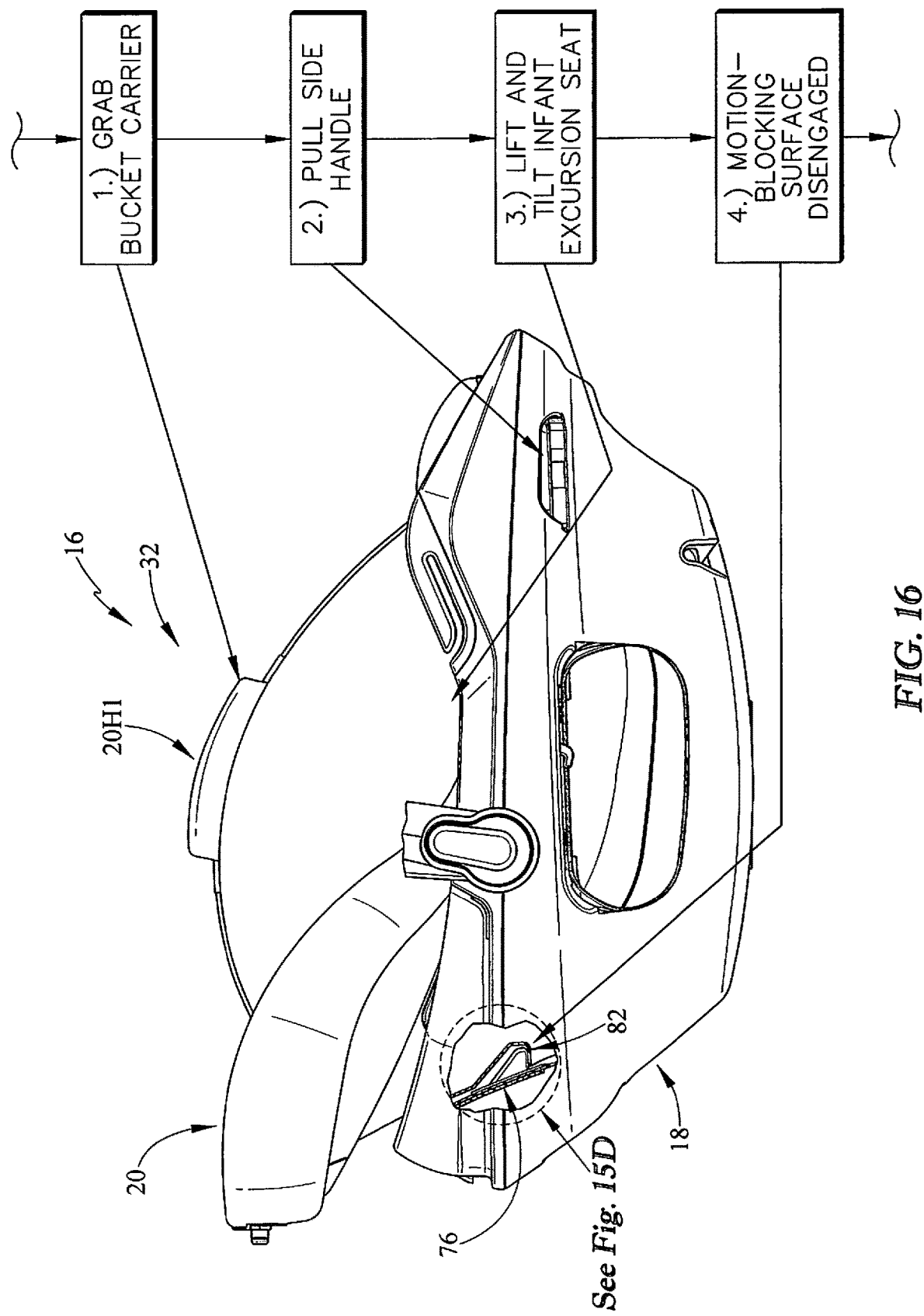
FIG. 16 is a side elevation and diagrammatic view of the infant excursion seat and the excursion-seat carrier included in the infant transporter with a portion cut away to show the spring-loaded first seat-retainer latch received in the latch-receiving space in a fully installed position to describe a process in which a caregiver can operate the releasable seat-anchor system in accordance with the present disclosure to free the infant excursion seat to be separated from the excursion-seat carrier.
Figure 17:
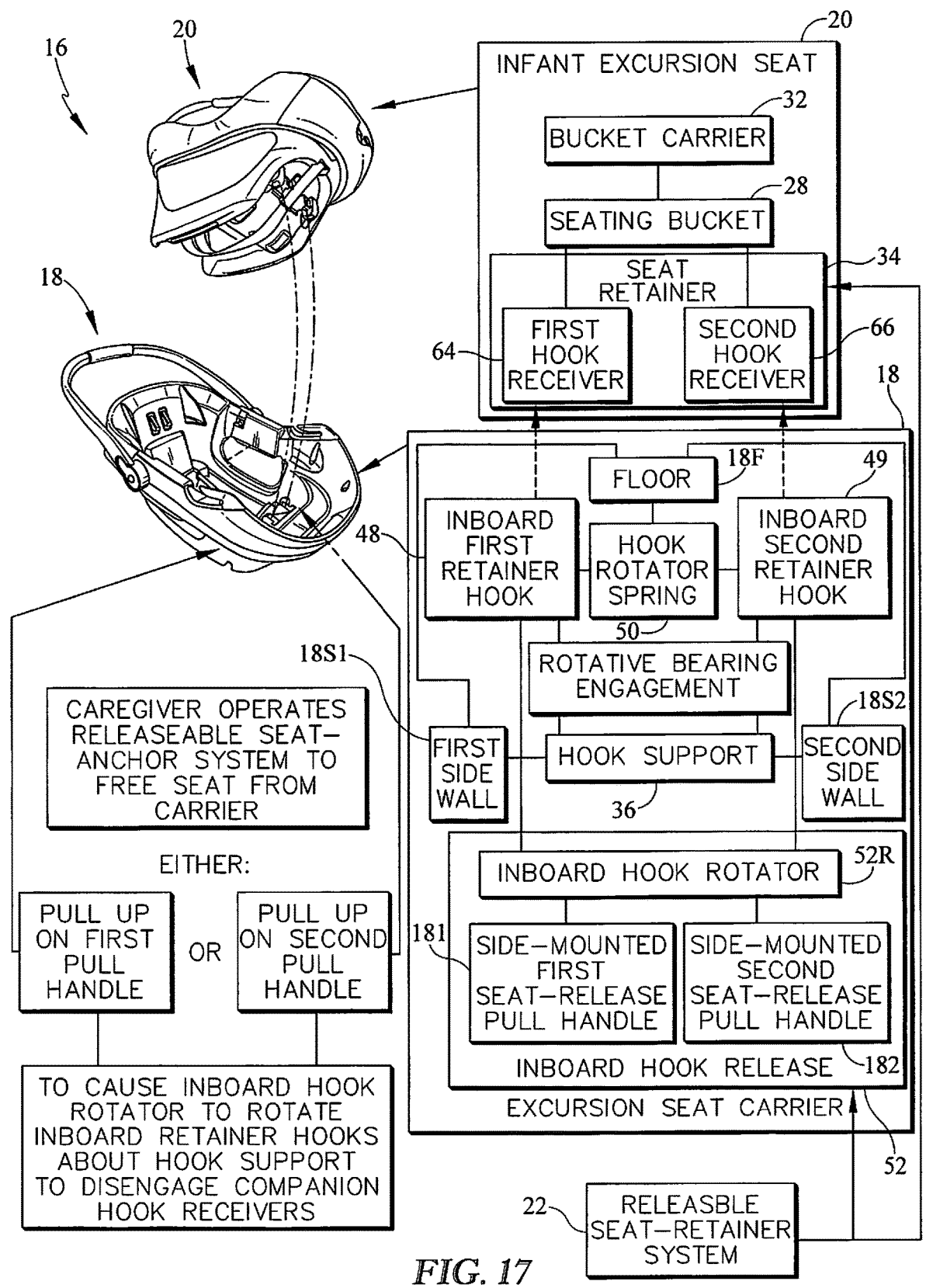
FIG. 17 is a diagrammatic view of the infant excursion seat and the excursion-seat carrier to illustrate components that cooperate to form the releasable seat-anchor system in accordance with the present disclosure and to describe a process in which a caregiver can operate the releasable seat-anchor system in accordance with the present disclosure to free the infant excursion seat to be separated from the excursion-seat carrier.
Figure 18:
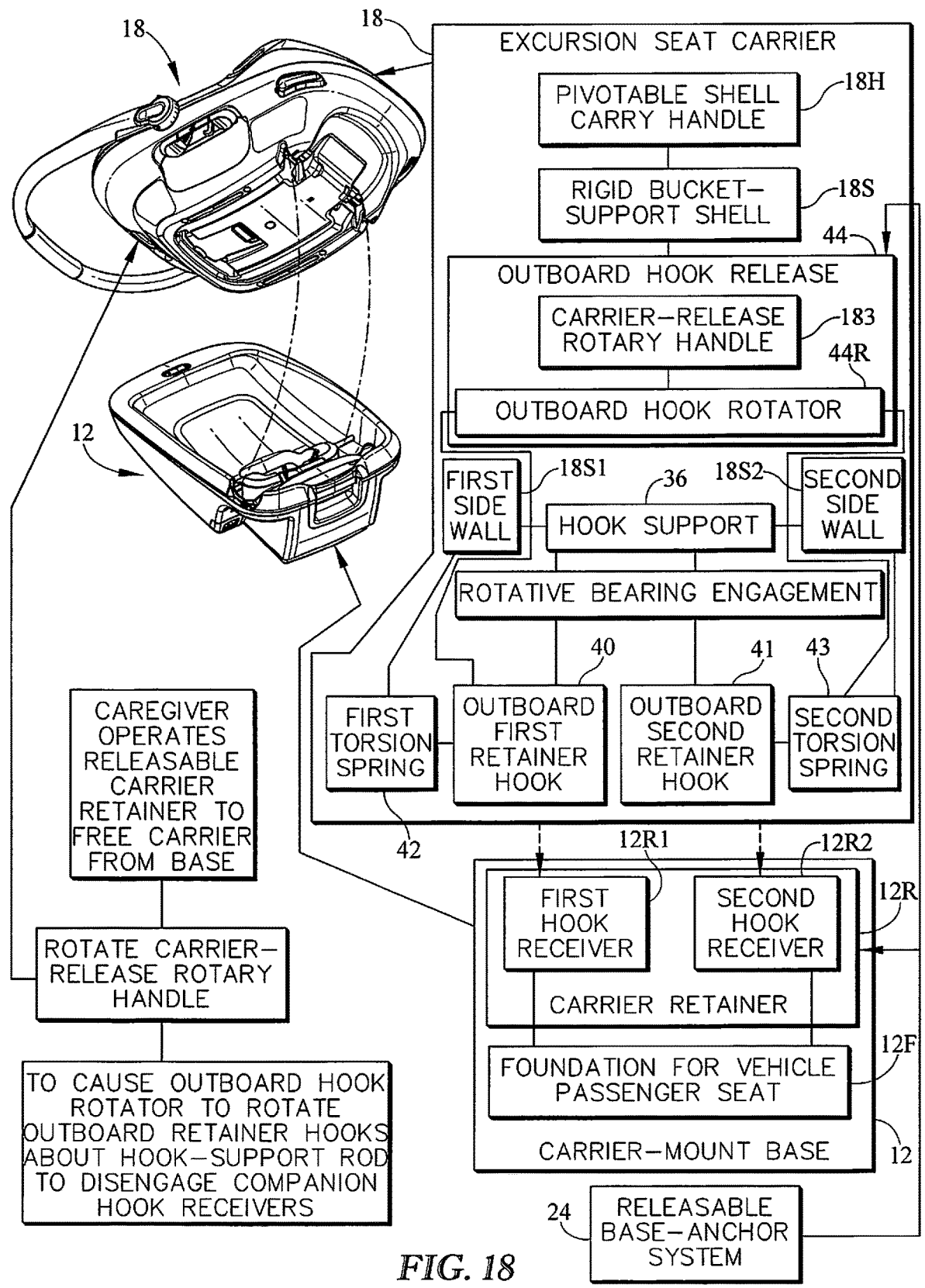
FIG. 18 is a diagrammatic view of the excursion-seat carrier and the carrier-mount base to illustrate components that cooperate to form the releasable base-anchor system in accordance with the present disclosure and to describe a process in which a caregiver can operate the releasable base-anchor system in accordance with the present disclosure to free the carrier-mount base to be separated from the excursion-seat carrier.

Child restraint 10 further includes an auxiliary seat-anchor system 74 associated with infant excursion seat 20 and coupled to excursion-seat carrier 18 as shown in FIGS. 15A-16. Seating bucket 28 of infant excursion seat 20 includes a head end 28H, an opposite foot end 28F, and first and second side walls 28S1, 28S2 arranged to lie in laterally spaced-apart relation to one another to interconnect the head and foot ends 28H, 28F to form a boundary of interior child-receiving space 30 formed in seating bucket 28. Seat retainer 34 is coupled to the opposite foot end 28F of seating bucket 28. Auxiliary seat-anchor system 74 includes a spring-loaded first seat-retainer latch 76 mounted on rearward end 18SR of bucket-support shell 18S for movement relative to bucket-support shell 18S between a NORMAL EXTENDED position arranged to extend toward forward end 18SF of bucket-support shell 18S and a TEMPORARY RETRACTED position to lie relatively further away from forward end 18SF of bucket-support shell 18S. Spring-loaded first seat-retainer latch 76 includes a downwardly facing barrier surface 78 and an inclined ramp 80 that cooperates with downwardly facing barrier surface 78 to form a non-obtuse included angle 79 there between.

Auxiliary seat-anchor system 74 further includes a first lug 82 coupled to head end 28H of seating bucket 28 cooperatively to form a first-latch receiver 83 above first lug 82 as shown in FIGS. 15B-15C. First lug 82 includes an upwardly facing motion-blocking interior surface 84 facing into first latch receiver 83 and a downwardly facing latch-moving exterior surface 86 facing away from the first latch receiver 83. Spring-loaded first seat-retainer latch 76 is arranged to move from the NORMAL EXTENDED position to the TEMPORARY RETRACTED position during sliding movement of downwardly facing latch-moving exterior surface 86 of first lug 82 on the inclined ramp 80 of spring-loaded first seat-retainer latch 76 as seating bucket 28 of the infant excursion seat 20 initially is lowered into bucket-support shell 18S of excursion-seat carrier 18 as shown in FIG. 15C. Spring-loaded first seat-retainer latch 76 is arranged to move from the TEMPORARY RETRACTED position to the NORMAL EXTENDED position to extend into the first latch receiver during subsequent disengagement of downwardly facing latch-moving exterior surface 86 of first lug 82 and inclined ramp 80 in response to further lowering of seating bucket 28 of infant excursion seat 20 into bucket-support shell 18S of excursion-seat carrier 18 so that upwardly facing motion-blocking interior surface 84 of first lug 82 is arranged to lie in confronting relation to downwardly facing barrier surface 78 of the spring-loaded first seat-retainer latch 76 to block separation of infant excursion seat 20 from excursion-seat carrier 18.

In the illustrative embodiment, auxiliary seat-anchor system 74 further includes a spring-loaded second seat-retainer latch 77 and a corresponding second lug 85 as shown in FIG. 15. Second seat-retainer latch 77 and second lug 85 are identical to first seat-retainer latch 76 and first lug 82 and cooperate in the same manner described above for first seat-retainer latch 76 and first lug 82.

Removal of infant excursion seat 20 may occur by a caregiver grasping bucket carrier 32 as suggested in FIG. 16. Side-mounted carry handles 20H1, 20H2 may be gripped by the caregiver using only one hand. The caregiver may then use the other hand to pull first or second side carry handle 181, 182 to disengage inboard first and second retainer hooks 48, 49 from seat retainer 34. Using bucket carrier 32, the caregiver may then lift infant excursion seat 20 from excursion seat carrier 18. Infant excursion seat 20 may tilt slightly as it is lifted and upwardly facing motion-blocking interior surface 84 of first lug 82 moves past downwardly facing barrier surface 78 to disengage motion-blocking surface 84 from spring-loaded first seat-retainer latch 76.

Child restraint 10 includes a carrier-mount base 12, an infant transporter 16, and seat anchor means as shown in FIG. 1. Child restraint may further include base anchor means for releasably anchoring the excursion-seat carrier 18 of infant transporter 16 to carrier retainer 12R of carrier-mount base 12 to allow a caregiver to unanchor excursion-seat carrier 18 from carrier retainer 12R of carrier-mount base 12 to separate infant transporter 20 while foundation 12F of carrier-mount base 12 remains on the passenger seat of the vehicle so that an infant restrained in seating bucket 28 of the infant excursion seat 20 may be transported while infant excursion seat 20 remains anchored to excursion-seat carrier 18 using shell carry handle 18H of excursion-seat carrier 18. Child restraint 10 may further include seat anchor means for releasably anchoring infant excursion seat 20 to excursion-seat carrier 18 to allow a caregiver to separate infant excursion seat 20 from excursion-seat carrier 18 while excursion seat carrier 18 remains anchored to carrier-mount base 12 so that an infant restrained in seating bucket 28 of infant excursion seat 20 may be transported using carry handles 20H1, 20H2 coupled to seating bucket 28.

Child restraint 10 in accordance with the present disclosure includes a base 12, an outer carrier shell 18, and a child carrier 20. The base 12 is adapted to couple to a vehicle seat and restrain the child restraint 10 in a vehicle. The outer carrier shell 18 is configured to provide increased protection for a child and is formed to include an inner child carrier region. The child carrier 20 is adapted to be received in the inner child carrier region and arranged to couple the child carrier 20 to the outer carrier shell 18.

The child restraint 10 further includes a dual locking system 22, 24 coupled to the outer carrier shell 18 that is configured to independently lock the outer carrier shell 18 to the base 12 and to lock child carrier 20 to the outer carrier shell 18. The locking system 22, 24 includes a support rod 36, a pair of outer base hooks 40, 41, and a pair of inner carrier hooks 48, 49. The support rod 36 is mounted to the outer carrier shell 18. The pair of outer base hooks 40, 41 are configured to couple selectively the outer carrier shell 18 to the base 12. The pair of inner carrier hooks 40, 41 are configured to couple selectively the outer carrier shell 18 to the child carrier 20.

The pair of outer base hooks 40, 41 are coupled to the support rod 36 for pivotable movement about a support rod axis 36A from a locked position in which separation of the outer carrier shell 18 from the base 12 is blocked to a freed position in which the outer carrier shell 18 is free to separate from the base 12. The inner carrier hooks 48, 49 are also coupled to the support rod 36 for pivotable movement about the support rod axis 36A from a locked position in which separation of the child carrier 20 from the outer carrier shell 18 is blocked to a freed position in which the child carrier 20 is free to separate from the outer carrier shell 18. Outer base hooks 40, 41 are movable independently of inner carrier hooks 48, 49 so that the outer carrier shell 18 may be separated from the base 12 independently of the child carrier 20 being separated from the outer carrier shell 18.

In the locked positions, the hooks 40, 41, 48, 49 engage respective attachment features, such as, for example, a bar, tab, or notch, on the base 12 or the carrier 20 to retain the outer carrier shell 18 to the base 12 and the carrier 20 to the outer carrier shell 18. In the freed positions, the hooks 40, 41, 48, 49 are pivoted out of engagement with the respective attachment feature so that the base 12, outer carrier shell 18 and child carrier 20 can be separated. The outer base hooks 40, 41 and the inner carrier hooks 48, 49 are pivoted in the same direction but move independently of one another depending on if the user wants to separate the outer carrier shell 18 from the base 12 or the child carrier 20 from the outer carrier shell 18.

The locking system 22, 24 further includes a base release actuator 183 and a carrier release actuator 181, 182. The base release actuator 183 is configured to move the outer base hooks 40, 41 from the locked position to the freed position so that the outer carrier shell 18 can be removed from the base 12. The carrier release actuator 181, 182 is configured to move the inner carrier hooks 48, 49 from the locked position to the freed position so that the child carrier 20 can be removed from the outer carrier shell 18.

The invention claimed is:

1. A child restraint comprising
a carrier-mount base including a foundation adapted to set on a passenger seat in a vehicle and a carrier retainer coupled to the foundation,
an infant excursion seat includes a seating bucket formed to include an interior child-carrying space, a bucket carrier coupled to the seating bucket and adapted to be gripped by a caregiver to facilitate transport of the seating bucket relative to the carrier-mount base, and a seat retainer coupled to the seating bucket and arranged to face away from the interior child-carrying space, and
an excursion-seat carrier including a bucket-support shell formed to include a bucket-receiving space sized to receive a portion of the seating bucket when the seating bucket is mounted on the bucket-support shell, a shell carry handle coupled to the bucket-support shell, a hook support coupled to the bucket-support shell, a releasable seat-anchor system associated with the infant excursion seat and coupled to the bucket-support shell, and a releasable base-anchor system associated with the carrier-mount base and coupled to the bucket-support shell,
wherein the releasable base-anchor system includes an outboard first retainer hook mounted on the hook support for rotation about the hook support, an outer first hook-rotator spring arranged to act between the bucket-support shell and the outboard first retainer hook to urge the outboard first retainer hook to rotate in a first direction about the hook support to extend downwardly to engage the carrier retainer of the carrier-mount base to block separation of the excursion-seat carrier from the carrier-mount base when the excursion-seat carrier is mounted on a topside of the carrier-mount base, and an outboard-hook release arranged to rotate the outboard first retainer hook about the hook support in an opposite second direction to overcome a biasing torque applied by the outer first hook-rotator spring to disengage the outboard first retainer hook from the carrier retainer of the carrier-mount base to free the excursion-seat carrier to be separated from the carrier-mount base by a caregiver, and
wherein the releasable seat-anchor system includes an inboard first retainer hook mounted on the hook support for rotation about the hook support, an inner hook-rotator spring arranged to act between the bucket-support shell and the inboard first retainer hook to urge the inboard first retainer hook to rotate in the first direction about the hook support to extend upwardly to engage the seat retainer of the infant excursion seat to block separation of the infant excursion seat from the excursion-seat carrier when the infant excursion seat is mounted on a topside of the excursion-seat carrier, and an inboard-hook release arranged to rotate the inboard first retainer hook about the hook support in the opposite second direction to overcome a biasing torque applied by the inner hook-rotator spring to disengage the inboard first retainer hook from the seat retainer of the infant excursion seat to free to infant excursion seat to be separated from the excursion-seat carrier by a caregiver.

2. The child restraint of claim 1, wherein the hook support is an elongated rod that is arranged to extend laterally along a central rod axis between opposing first and second side walls of the bucket-support shell, the outboard first retainer hook is arranged to lie in spaced-apart relation to the second side wall to locate the inboard first retainer hook therebetween, and each of the outboard and inboard first retainer hooks is mounted in rotative bearing engagement with the elongated rod to rotate independently of one another about the central rod axis.

3. The child restraint of claim 2, wherein the releasable base-anchor system further includes an outboard second retainer hook mounted in rotative bearing engagement with the elongated rod to rotate about the central rod axis and arranged to lie in spaced-apart relation to the outboard first retainer hook to locate the inboard first retainer hook therebetween, and the outboard-hook release is arranged to be mounted relative to the bucket-support shell to rotate the outboard first and second retainer hooks in unison in the opposite second direction about the central rod axis without rotating the inboard first retainer hook about the central rod axis in the opposite second direction.

4. The child restraint of claim 3, wherein the releasable seat-anchor system further includes an inboard second retainer hook mounted in rotative bearing engagement with the elongated rod to rotate about the central rod axis independent rotation of the outboard first and second retainer hooks about the central rod axis and arranged to lie between the inboard first retainer hook and the outboard second retainer hook and the inboard-hook release is arranged to be moved relative to the bucket-support shell to rotate the inboard first and second retainer hooks in the second opposite direction in unison about the central rod axis without rotating the outboard first and second retainer hooks about the central rod axis in the opposite second direction.

5. The child restraint of claim 1, wherein the outboard-hook release includes a carrier-release rotary handle mounted on the bucket-support shell for rotation about a handle-rotation axis and an outboard hook rotator coupled to the outboard first retainer hook and to the carrier-release rotary handle and arranged to rotate the outboard first retainer hook about the hook support in the opposite second direction without rotating the inboard first retainer hook about the hook support in response to rotation of the carrier-release rotary handle about the handle-rotation axis.

6. The child restraint of claim 5, wherein the inboard-hook release includes a first seat-release pull handle mounted on the bucket-support shell for sliding movement relative to the bucket-support shell and an inboard hook rotator coupled to the inboard first retainer hook and to the first seat-release pull handle and arranged to rotate the inboard first retainer hook about the hook support in the opposite second direction without rotating the outboard first retainer hook about the hook support in response to sliding movement of the first seat-release pull handle relative to the bucket-support shell.

7. The child restraint of claim 6, wherein the inboard hook release further includes a second seat-release pull handle mounted on the bucket-support shell to lie in spaced-apart relation to the first seat-release pull handle for sliding movement relative to the bucket-support shell and the inboard hook rotator is also coupled to the second seat-release pull handle and arranged to rotate the inboard first retainer hook about the hook support in response to sliding movement of the second seat-release pull handle relative to the bucket-support shell.

8. The child restraint of claim 7, wherein the bucket-support shell has a rearward end and an opposite forward end, the carrier-release rotary handle is coupled to the rearward end, the first seat-release pull handle is coupled to a first side of the opposite forward end, and the second seat-release pull handle is coupled to an opposite second side of the opposite forward end.

9. The child restraint of claim 8, wherein the seating bucket has a head end configured to receive a head of an infant seated in the interior child-carrying space and an opposite foot end configured to receive feet of an infant seated in the interior child-carrying space, the head end of the seating bucket is aligned to lie in close proximity to the rearward end of the bucket-support shell and the foot end of the seating bucket is aligned to lie in close proximity to the forward end of the bucket-support shell when the seating bucket of the infant excursion seat is retained in a stationary position on the bucket-support shell of the excursion seat carrier.

10. The child restraint of claim 1, wherein the inboard hook release further includes a second seat-release pull handle mounted on the bucket-support shell for sliding movement relative to the bucket-support shell, the first seat-release handle is located on a first side of the bucket-support shell, the second seat-release handle is located on an opposite second side of the bucket-support shell to lie in laterally spaced-apart relation to the first seat-release handle, and the inboard hook rotator is coupled to each of the first and second seat-release handles and is configured to rotate the inboard first retainer hook in the opposite second direction about the hook support in response to sliding movement of one of the first and second seat-release pull handles relative to the budget-support shell of the seat-excursion carrier.

11. The child restraint of claim 10, wherein the outboard hook release includes the first spring coupled to bucket-support shell and the outboard first retainer hook and arranged yieldably to move the outboard first retainer hook relative to the bucket-support shell from a temporary raised position to a relatively lower normal lowered position, and a second spring coupled to the bucker-support shell and an outboard second retainer hook and arranged yieldably to move the outboard second retainer hook relative to the bucket-support shell from a temporary raised position to a relatively lower normal lowered position, and the outboard hook rotator is configured to provide means for rotating the outboard first and second retainer hooks to disengage the carrier retainer included in the excursion seat shell in response to movement of the carrier-release rotary handle to free the excursion-seat carrier to be separated from the carrier-mount base by a caregiver.

12. The child restraint of claim 1, wherein the releasable seat-anchor system further includes an outboard second retainer hook mounted on the hook support for rotation about the hook support, the inner hook-rotator spring includes a hook bridge arranged to interconnect the inboard first and second retainer hooks to cause the inboard first and second retainer hooks to rotate in unison about the hook support and a torque generator arranged to interconnect the hook bridge to the bucket-support shell of the excursion-seat carrier and configured to yieldably rotate the hook bridge about the hook support to cause the inboard first and second retainer hooks to engage the seat retainer of the infant excursion seat to block separation of the infant excursion seat from the excursion-seat carrier when the infant excursion seat is mounted on the topside of the excursion-seat carrier.

13. The child restraint of claim 12, wherein the seat retainer of the infant excursion seat includes a plate mounted on an underside of the seating bucket, a first tab cantilevered to the plate to extend in a downward direction away from the interior child-carrying space formed in the seating bucket and formed to include a first hook-receiving aperture that is arranged to receive a distal portion of the inboard first retainer hook therein when the inboard first retainer hook is engaged to the seat retainer, and a second tab cantilevered to the plate to extend in a downward direction away from the interior child-carrying space formed in the seating bucket and to lie in laterally spaced-apart relation to the first tab and formed to include a second hook-receiving aperture that is arranged to receive a distal portion of the inboard second hook retainer therein when the inboard second retainer hook is engaged to the seat retainer.

14. The child restraint of claim 13, wherein the infant excursion seat further includes a child-restraint harness coupled to the seating bucket to restrain a child seated in the interior child-carrying space formed in the seating bucket, the plate is formed to include a central strap-receiving slot located between the first and second tabs, and the child-restraint harness includes a strap that is arranged to extend along the underside of the seating bucket and pass through the central strap-receiving slot formed in the plate.

15. The child restraint of claim 1, further comprising an auxiliary seat-anchor system associated with the infant excursion seat and coupled to the excursion-seat carrier, and wherein the seating bucket of the infant excursion seat includes a head end, an opposite foot end, and first and second side walls arranged to lie in laterally spaced-apart relation to one another to interconnect the head and foot ends to form a boundary of the interior child-receiving space formed in the seating bucket, the seat retainer is coupled to the opposite foot end of the seating bucket, and wherein the auxiliary seat-anchor system includes a spring-loaded first seat-retainer latch mounted on a rearward end of the bucket-support shell for movement relative to the bucket-support shell between a normal extended position arranged to extend toward an opposite forward end of the bucket-support shell and a temporary retracted position to lie relatively further away from the forward end of the seating bucket, the spring-loaded first seat-retainer latch includes a downwardly facing barrier surface and an inclined ramp that cooperates with the downwardly facing barrier surface to form a non-obtuse included angle there between, and the auxiliary seat-anchor system further includes a first lug coupled to the head end of the seating bucket cooperatively to form a first-latch receiver above the first lug, the first lug includes an upwardly facing motion-blocking interior surface facing into the first latch receiver and a downwardly facing latch-moving exterior surface facing away from the first latch receiver, and wherein the spring-loaded first seat-retainer latch is arranged to move from the normal extended position to the temporary retracted position during sliding movement of the downwardly facing latch-moving exterior surface of the first lug on the inclined ramp of the spring-loaded first seat-retainer latch as the seating bucket of the infant excursion seat initially is lowered into the bucket-support shell of the excursion-seat carrier, and wherein the spring-loaded first seat-retainer latch is arranged to move from the temporary retracted position to the normal extended position to extend into the first latch receiver during subsequent disengagement of the downwardly facing latch-moving exterior surface of the first lug and the inclined ramp in response to further lowering of the seating bucket of the infant excursion seat into the bucket-support shell of the excursion-seat carrier so that the upwardly facing motion-blocking interior surface of the first lug is arranged to lie in confronting relation to the downwardly facing barrier surface of the spring-loaded first seat-retainer latch to block separation of the infant excursion seat from the excursion-seat carrier.

16. A child restraint comprising a carrier-mount base including a foundation adapted to set on a passenger seat in a vehicle and a carrier retainer coupled to the foundation, an infant transporter including an excursion-seat carrier and an infant excursion seat configured to hold an infant, the excursion-seat carrier including a bucket-support shell and a shell carry handle mounted for pivotable movement on the bucket-support shell, the infant excursion seat including a seating bucket and a carry handle coupled to the seating bucket, base anchor means for releasably anchoring the excursion-seat carrier of the infant transporter to the carrier retainer of the carrier-mount base to allow a caregiver to unanchor the excursion-seat carrier from the carrier retainer of the carrier-mount base to separate the infant transporter while the foundation of the carrier-mount base remains on the passenger seat of the vehicle so that an infant restrained in the seating bucket of the infant excursion seat may be transported while the infant excursion seat remains anchored to the excursion-seat carrier using the shell carry handle of the excursion-seat carrier, and seat anchor means for releasably anchoring the infant excursion seat to the excursion-seat carrier to allow a caregiver to separate the infant excursion seat from the excursion-seat carrier while the excursion seat carrier remains anchored to the carrier-mount base so that an infant restrained in the seating bucket of the infant excursion seat may be transported using the carry handle coupled to the seating bucket.

* * * * *